US008626147B2

(12) United States Patent
Danford et al.

(10) Patent No.: US 8,626,147 B2
(45) Date of Patent: *Jan. 7, 2014

(54) VIRTUAL INSTANCE ARCHITECTURE FOR MOBILE DEVICE MANAGEMENT SYSTEMS

(71) Applicant: Mobile Iron, Inc., Mountian View, CA (US)

(72) Inventors: Timothy E. Danford, Redwood City, CA (US); Suresh Kumar Batchu, Milpitas, CA (US)

(73) Assignee: Mobile Iron, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,996

(22) Filed: Feb. 6, 2013

(65) Prior Publication Data

US 2013/0217378 A1 Aug. 22, 2013

Related U.S. Application Data

(63) Continuation of application No. 13/245,197, filed on Sep. 26, 2011, now Pat. No. 8,396,465, which is a continuation of application No. 12/181,124, filed on Jul. 28, 2008, now Pat. No. 8,060,074.

(60) Provisional application No. 60/952,629, filed on Jul. 30, 2007, provisional application No. 61/022,869, filed on Jan. 23, 2008.

(51) Int. Cl.
*G06F 9/46* (2006.01)
*G06F 9/455* (2006.01)
*H04M 3/42* (2006.01)

(52) U.S. Cl.
USPC ........... 455/419; 718/100; 703/23; 455/414.1

(58) Field of Classification Search
USPC ............. 703/25, 27, 23; 455/419, 67.11, 405, 455/406, 407, 408, 414.1, 550.1; 709/201; 718/100
See application file for complete search history.

(56) References Cited

U.S. PATENT DOCUMENTS

| | | | | |
|---|---|---|---|---|
| 7,162,410 | B1 * | 1/2007 | Nemecek et al. | 703/28 |
| 7,338,376 | B2 * | 3/2008 | Eck et al. | 463/42 |
| 2005/0256697 | A1 * | 11/2005 | Narayanaswami et al. | 703/27 |
| 2005/0267729 | A1 * | 12/2005 | Poplack et al. | 703/25 |
| 2006/0085792 | A1 * | 4/2006 | Traut | 718/100 |
| 2006/0259292 | A1 * | 11/2006 | Solomon et al. | 703/27 |

* cited by examiner

*Primary Examiner* — Nizar Sivji
(74) *Attorney, Agent, or Firm* — Van Pelt, Yi & James LLP

(57) ABSTRACT

System and method for remotely managing mobile devices. A virtual instance mobile device is maintained for each physical mobile device to be managed. Each virtual instance mobile device is executable in a computer runtime environment and includes a hardware emulation component configured to emulate the hardware components of the corresponding physical mobile device and a software emulation component corresponding to the software components of the physical mobile device, which is executable within the context of the hardware emulation component. Synchronization between the virtual instance mobile devices and their corresponding physical mobile devices is maintained, and data obtained from the physical mobile devices is stored. The physical mobile devices are remotely managed by utilizing their corresponding virtual instance mobile devices respectively.

13 Claims, 13 Drawing Sheets

VIRTUAL INSTANCE ARCHITECTURE FOR MOBILE DEVICE MANAGEMENT SYSTEMS

CROSS REFERENCE TO OTHER APPLICATIONS

This application is a continuation of co-pending U.S. patent application Ser. No. 13/245,197, entitled VIRTUAL INSTANCE ARCHITECTURE FOR MOBILE DEVICE MANAGEMENT SYSTEMS filed Sep. 26, 2011 which is incorporated herein by reference for all purposes, which is a continuation of U.S. patent application Ser. No. 12/181,124, now U.S. Pat. No. 8,060,074, entitled VIRTUAL INSTANCE ARCHITECTURE FOR MOBILE DEVICE MANAGEMENT SYSTEMS filed Jul. 28, 2008 which is incorporated herein by reference for all purposes, which claims priority to U.S. Provisional Application No. 60/952,629, entitled VIRTUAL DEVICE ARCHITECTURE FOR MOBILE DEVICE MANAGEMENT SYSTEMS filed Jul. 30, 2007 and U.S. Provisional Application No. 61/022,869, entitled VIRTUAL INSTANCE ARCHITECTURE FOR MOBILE DEVICE MANAGEMENT SYSTEMS filed Jan. 23, 2008 which are incorporated herein by reference for all purposes.

TECHNICAL FIELD

This disclosure relates generally to mobile devices and management systems.

BACKGROUND OF THE INVENTION

In a manner similar to personal computers and laptops, business enterprises increasingly rely on mobile and handheld devices. Indeed, the capabilities and uses of mobile devices have moved beyond voice communications and personal information management applications to a variety of communications- and business-related functions including email, browsing, instant messaging, enterprise applications, and video applications. For example, the functionality of many mobile devices have been extended to include cellular and wireless local area network (WLAN) communications interfaces, as well as virtual private network (VPN) and other client applications. Furthermore, mobile devices used in enterprises may also include enterprise applications used by workers in the field or otherwise.

Deployment, management and configuration of mobile and handheld devices in enterprise environments, however, present certain challenges. For example, the vast and constantly changing variety of mobile device types, functions and capabilities presents challenges to configuration, provisioning and troubleshooting. Moreover, the increasing capabilities and integration of mobile devices present challenges to network security.

Various management systems have been developed to remotely manage mobile devices in an enterprise environment, including, for example, data protection and synchronization, device security, application deployment, etc. A few such management systems employ the concept of a virtual device or virtual device domain, where a device management system maintains data associated with one or more mobile devices and allows users to change the data for the mobile device. The device management system synchronizes the data maintained for the mobile device and the data stored on the mobile device itself to help remotely manage the mobile devices. The virtual mobile devices maintained by such device management systems, however, are merely snapshot images of their corresponding physical mobile devices, representing the states of corresponding physical mobile devices at a particular instant. These virtual mobile devices are not executable entities that emulate the operations and/or functionalities of the physical mobile device.

SUMMARY

The invention relates to remotely managing physical mobile devices in an enterprise environment by utilizing the concept of virtual mobile devices, where each virtual mobile device corresponds to a physical mobile device being managed. In one embodiment, a mobile device management system is provided. The system comprises at least one virtual mobile device corresponding to at least one physical mobile device, wherein each virtual mobile device corresponds to a unique physical mobile device and is executable in a virtual computer runtime environment; a synchronization component configured to synchronize the at least one virtual mobile device with the corresponding at least one physical mobile device respectively; a data store configured to store data obtained from the at least one physical mobile device; and a management component configured to remotely manage the at least one physical mobile device by utilizing the corresponding at least one virtual mobile device respectively.

In another embodiment, an apparatus for remotely managing a mobile device is provided. The apparatus comprises a processor; a memory; at least one network interface; a device emulation component for the mobile device, which comprises a hardware emulation component configured to emulate hardware components of the mobile device; and a software emulation component corresponding to software components of the mobile device and executable within the context of the hardware emulation component; and a device management component configured to remotely manage the mobile device, comprising computer-readable medium having a plurality of computer program instructions stored therein, which are operable to cause the processor to maintain and execute the device emulation component in a computer runtime environment, synchronize the device emulation component with the corresponding mobile device, store data obtained from the mobile device in the memory, and remotely manage the mobile device by emulating the mobile device in the computer runtime environment using the device emulation component.

Both the hardware and the software emulation components in a virtual mobile device are executable in a computer runtime environment. When remotely managing a physical mobile device, its corresponding virtual mobile device's hardware and/or software emulation components are executed to replicate the behavior, functionalities, and characteristics of the same software being executed on the actual hardware of the physical mobile device.

Other aspects and advantages of the invention will become apparent from the following detailed description taken in conjunction with the accompanying drawings.

BRIEF DESCRIPTION OF THE DRAWINGS

Various embodiments of the invention are disclosed in the following detailed description and the accompanying drawings.

DESCRIPTION OF EXAMPLE EMBODIMENT

A. Overview

Figure 1A:
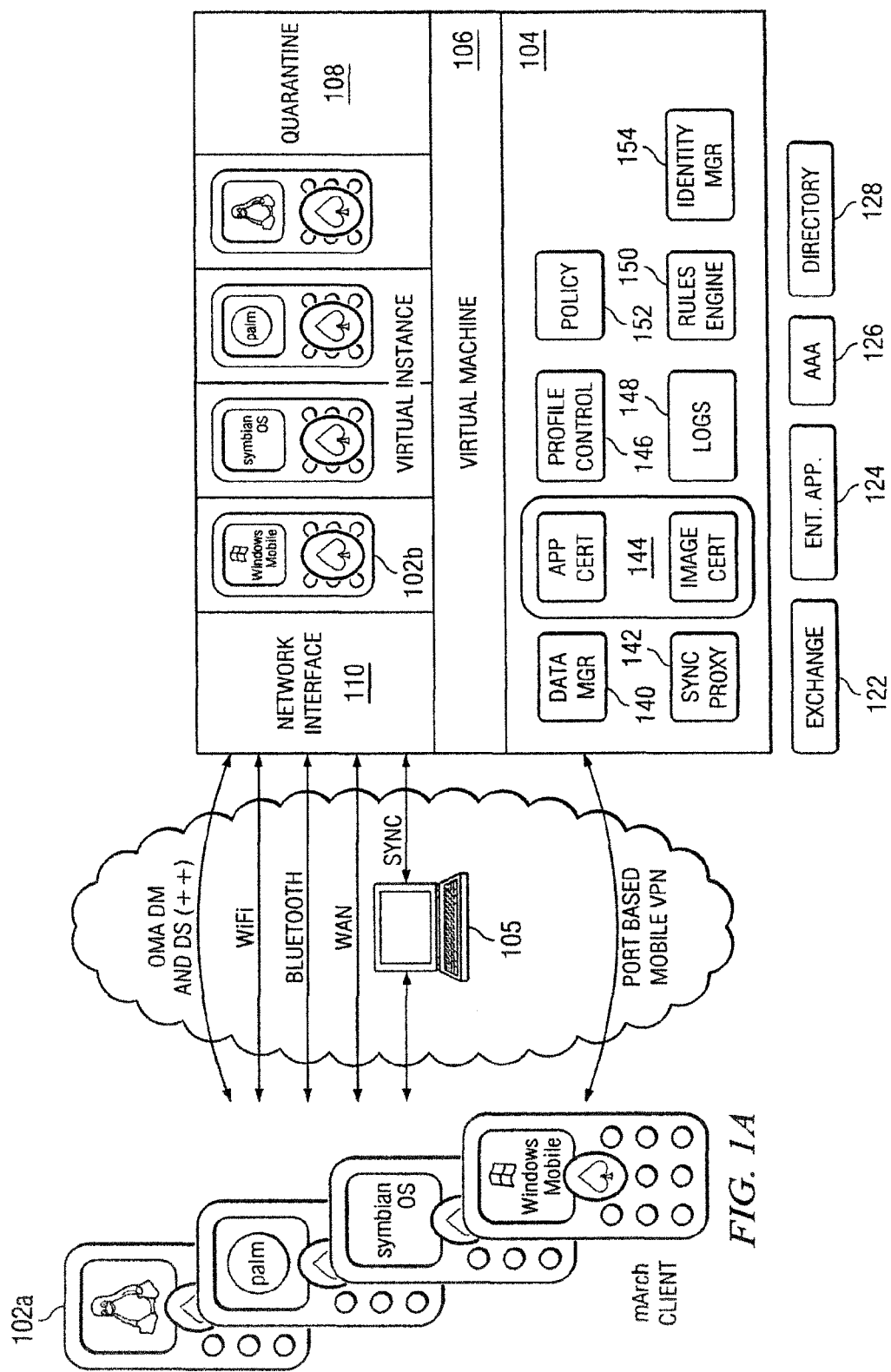
FIGS. 1A to 1D are schematic diagrams illustrating an example mobile device management architecture according to one implementation of the invention.

The present invention provides methods, apparatuses and systems directed to facilitating deployment, configuration, and/or management of mobile devices. In one implementation, for each of one or more mobile devices, a mobile device management application, maintains a virtual instance of a given mobile device, and interacts with a control client application hosted on the physical instance of the mobile device to synchronize the state of the physical instance of the mobile device with the virtual instance of that mobile device. In a particular implementation, the control client logs man-machine interface (MMI) data, file system commands, and other data characterizing usage of, and/or the actions performed on, the mobile device. Some or all of the log data is provided to the remote device management application hosted on a device management server, which can synchronize the state of the virtual instance of the mobile device. In this manner, the device management application provides an administrator a snapshot of the state of the mobile device, and facilitates device management operations, as described below.

In a particular implementation, a virtual instance of a mobile device is a running instantiation of the mobile device that can execute or operate in a virtualized execution environment. For example, a server may host a virtual machine that emulates the hardware (such as the microprocessor or controller) of the mobile device, allowing a copy of the mobile device operating system to be run. Additionally, one or more applications installed on the actual mobile device can also run on top of the mobile device operating system. The virtual instance of the mobile device may also include all or a subset of the file system image of the mobile device, as well as device configuration and settings. In one implementation, the logged usage data transmitted from the control client application can be used to replay, using the virtual instance of the mobile device, the actions taken by a user on a mobile device for a desired period of time. Still further, a device management server 104, in some implementations, may support an interface that presents a rendered image of the mobile device and activatable man-machine interface that allows a user to input commands to, and otherwise interact with, the virtual instance of the mobile device.

In one implementation, there is a one-to-one correspondence between a virtual instance and a physical instance of a mobile device. The virtual instance of the mobile device includes a hardware emulation layer and a software emulation layer. The hardware and software emulation layers emulate the hardware and software components of the physical instance of the mobile device respectively. Both the hardware and software emulation layers are executable in a computer runtime environment, and generally, the software emulation layer is executable within the context of the hardware emulation layer to replicate the behavior, operations, and/or characteristics of the same software being executed on the actual physical mobile device. The mobile device management application executes the hardware and/or software emulation layers of a virtual instance of a mobile device in connection with remote management of the physical instance of the mobile device.

B. Operation and System Architecture

Figure 1B:
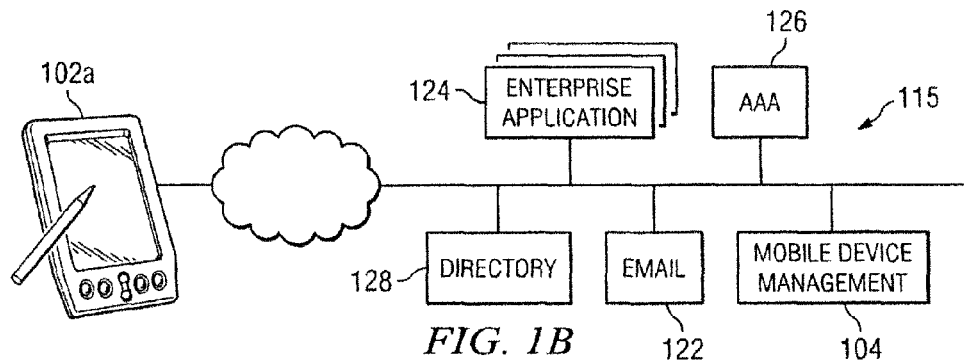

FIGS. 1A and 1B are schematic diagrams illustrating the interaction between a physical instance of a mobile device 102a and a device management server 104 operative to maintain a virtual instance of the mobile device 102b. As FIG. 1A illustrates, a physical instance of a mobile device 102a may communicate with device management server 104 over a variety of communication channels and networks, such as WLAN/WiFi, BlueTooth, Wide Area Networks (WANs), and/or indirectly via a personal computer 105 during synchronization. As FIG. 1B illustrates, device management server 104 may be operably connected to an enterprise network 115. Enterprise network 115 may further include one or more of email or exchange servers 122, enterprise application servers 124, authentication (AAA) servers 126, directory servers 128, Virtual Private Network gateways, firewalls, and the like. Mobile devices 102a may access or utilize one or more of the enterprise systems or functionality described above.

Figure 1C:
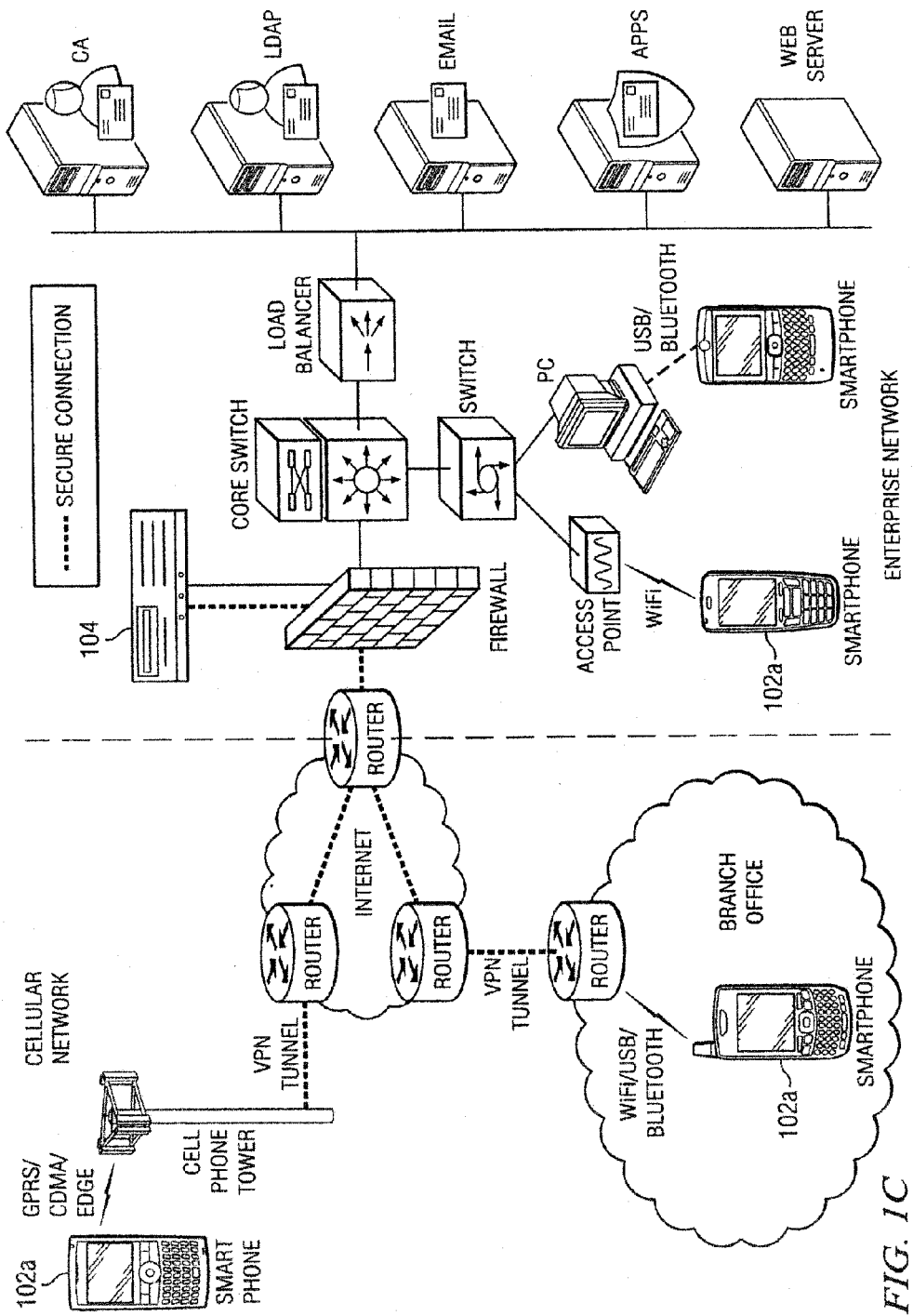
Figure 1D:
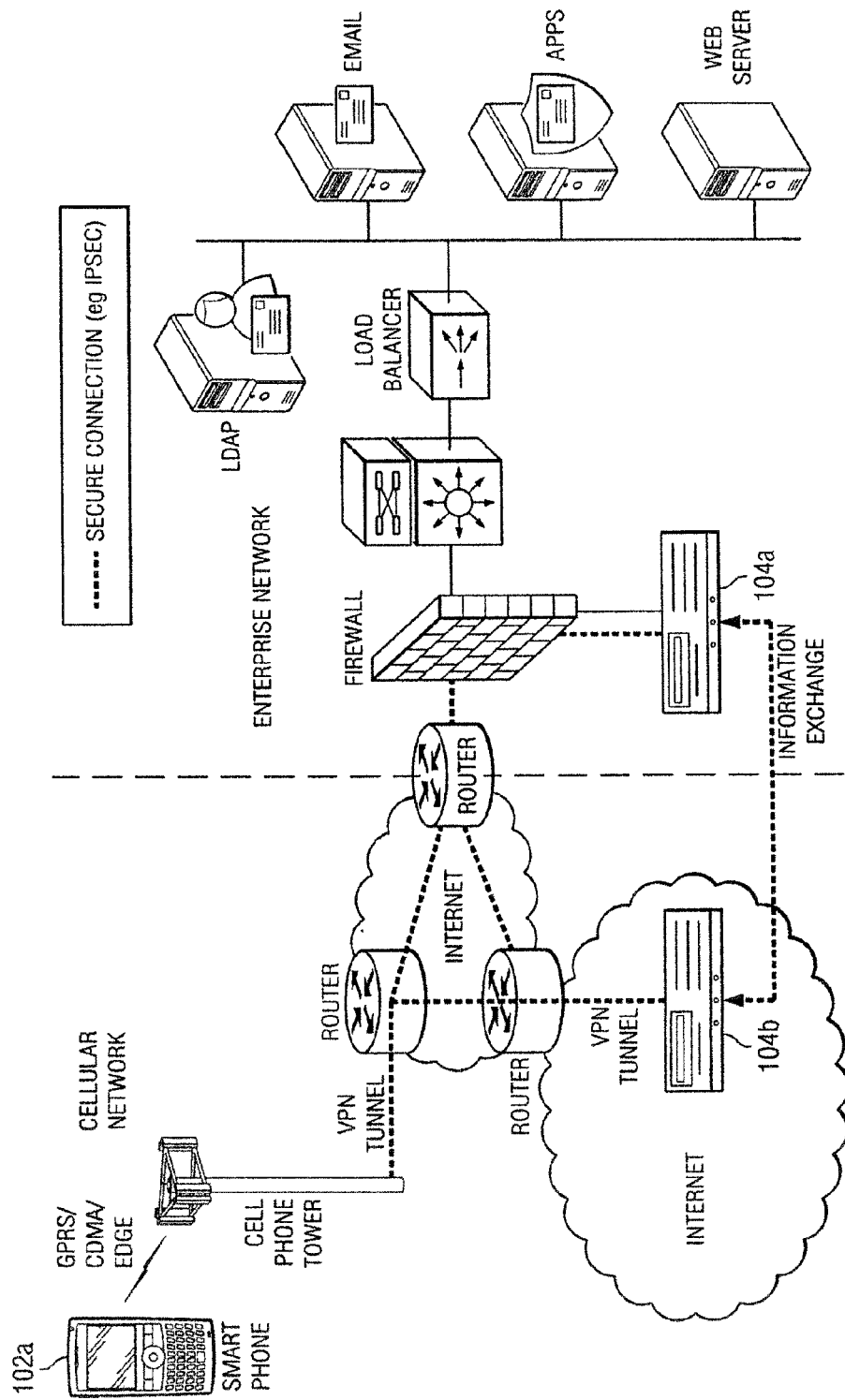

FIGS. 1C and 1D illustrate other example deployment architectures. Device management server 104 can be installed in many locations like inside the data center, a de-militarized zone (DMZ), topologically in-front of enterprise application servers and in the cloud depending on the requirements of the network administrator. FIG. 1C illustrates deployment of device management server 104 in the DMZ. As seen in FIG. 1C above, device management server 104 may reside in the enterprise DMZ and act as a proxy device for all data traffic coming from the physical instances 102a of the mobile devices connecting through external networks, such as GPRS/EDGE networks, or wireless networks (e.g., WiFi). All the data traffic that comes from the mobile phones will first come to device management server 104 and from there the traffic will go to their final destinations. To direct all traffic from the mobile devices to device management server 104, an IPSEC tunnel may be used where the IPSEC tunnel is terminated at device management server 104. There can be at least two modes of operation here—split-tunneling and full tunneling. In split tunneling mode, all traffic that is destined to the enterprise network will come through the IPSEC tunnel and any other traffic that is destined to the internet will go directly to the internet through the operator's network. In full tunneling mode, all traffic irrespective of internet traffic or enterprise network traffic will first come to device management server 104 before going out. In the full tunneling mode, device management server 104 can offer more comprehensive security and controls to the administrators as all traffic passes through the device management server 104, giving administrators full control of the traffic going in and out of the physical instance 102a of a mobile device.

FIG. 1D illustrates a Software as a Service (SaaS) deployment architecture. In this model, a device management server 104b resides in a remote network relative to the enterprise, and can be remotely managed by enterprise administrators. This sort of model is well-suited for companies that have more SaaS-based applications where the data traffic usually does not come to the enterprise network. Clients are directly served from the servers sitting in the internet. In this case, a deployment architecture where network traffic first comes to the enterprise network over IPSec Tunnels, and then goes to the internet to host applications may be inefficient because it adds another hop to the network. Also this model is mostly suitable for enterprises that have lesser number of devices and cannot afford to manage them exclusively in the enterprise network. In an example SaaS model, the solution can be implemented as a single box and that means the administrators will log into the portal that is available to them to manage their devices or it can be deployed in junction with another device management server 104a in the enterprise network. In the two-box solution, the enterprise device management server 104a protects the traffic entering the enterprise, while the device management server 104b in the internet protects the traffic directly going to Internet from the mobile client. In this scenario, two IPSec tunnels are deployed for a given mobile device 102a to protect the traffic between the mobile client and the internet and enterprise networks. Any traffic that is destined to the enterprise will use the enterprise IPSEC tunnel and all other traffic will use the other IPSEC tunnel. In this case both the device management servers 104a, 104b can communicate with each other to accomplish various functions. If for some reason the device management server 104b in the hosted cloud sees some abnormal behavior (virus or something similar) it can immediately inform the device management server 104a in the enterprise to implement a policy to block the traffic coming from that particular mobile client.

B.1. Device Management Server

Device management server 104 may include, or operate in connection with, one or more of a data manager 140, a synchronization proxy 142, an application/image certification module 144, a profile control module 146, a log module 148, a rules engine 150, a policy module 152 and an identity manager 154. Device management server 104 may also operate in connection with one or more virtual instances of respective mobile devices. In one implementation, device management server 104 comprises one or more virtual machines 106, as required to emulate the hardware of different mobile device types. Each virtual instance 102b of a mobile device is a virtualized instance that is configured based on the configuration details and other attributes of the physical instance 102a of that mobile device. For example, the operating system that runs on the virtual machine 106 is selected to be the same version as that installed on the physical instance 102a of the mobile device. In addition, device management server 104 may maintain a virtual image of a data storage device(s) installed on the physical instance of the mobile device.

A virtual instance of a mobile device may comprise information relating to 1) one or more applications installed on the mobile device, 2) an operating system, 3) a microprocessor, controller, and/or other hardware functionality of the mobile device, and 4) an image of a storage device installed in the mobile device (such as a disk or flash/ROM image) including executable and non-executable files and data stored on a storage device of the mobile device. A storage device or file system image may comprise a computer file containing the complete contents and structure of a data storage medium or device, such as a hard drive, flash drive, etc. An image contains all the information necessary to replicate the structure and contents layout, as well as the actual contents, of a storage device. Device management server 104 may maintain this image information in a data store and load the virtual instance into the virtual execution environment as needed or in response to a command from an administrator.

The virtual instance of the mobile device is a running instance of the mobile device that executes in a virtual machine runtime environment. For example, the virtual machine runtime environment may emulate the hardware processor installed in the mobile device relative to the operating system. In a particular implementation, the virtual machine fully simulates the complete hardware of the mobile device, allowing an unmodified operating system to run in connection with the virtual machine. In other implementations, the virtual machine requires some modification to the operating system. The virtual machine 106 can be implemented using a Type 1 or Type 2 hypervisor. A Type 1 hypervisor runs directly on the hardware; a Type 2 hypervisor runs on another operating system, such as Linux. Each virtual machine can run any operating system supported by the underlying hardware. Device management server 104 can thus run two or more different "guest" virtual instances of respective mobile devices simultaneously, in separate "private" virtual computers. In some implementations, device management server 104 may operate in connection with multiple virtual machine types, as required for management of different mobile device platforms.

Device management server 104 may also include one or more network interfaces 110 for communication with remote hosts, such as the physical instances of mobile devices, as well as enterprise applications and the like. In some implementations, the virtual instances 102b of the mobile devices may communicate with remote hosts through the one or more network interfaces 110. Device management server 104 may further support a quarantine section 108, which is a conceptual area into which virtual instances of mobile devices may be placed. In some implementations, physical instances of mobile devices that have become infected with a virus may have their corresponding virtual instances placed in quarantine section 108. In addition, new virtual instances that have not been fully defined relative to the corresponding physical mobile device instance may also be placed in the quarantine section 108 until the full virtual instance has been defined. Placement of a virtual instance 102b of a mobile device in quarantine section 108 can effect policy or configuration changes on an enterprises network. For example, access to the enterprise network allowed to a physical instance 102a of a mobile device, while the virtual instance 102b is in quarantine section 108 may be restricted to data connections to device management server 104 in order to receive required configuration updates or patches, or to allow device management server 104 to discover one or more attributes of the physical instance in order to fully define the virtual instance.

B.2. Mobile Device Control Client & Other Functionality

A control client application 302 hosted on the physical mobile device may monitor operation of the mobile device and interact with the remote management application server 104 to allow the mobile device management application server 104 to synchronize the state of the physical and virtual instance of the mobile device. For example, the control client application 302 may include layers or hooks inserted into one or more communications or device protocol stacks to monitor and/or log data entered into or transmitted from the mobile device. For example, the control client application 302 may log the key strokes entered using a dial pad, keyboard, and/or pointing device. The control client application 302 may also monitor and log file system operations. In addition, the control client application 302 may monitor and log data transmitted to or from a communications interface, such as a cellular network interface, a wireless local area network interface, and the like.

Figure 2:
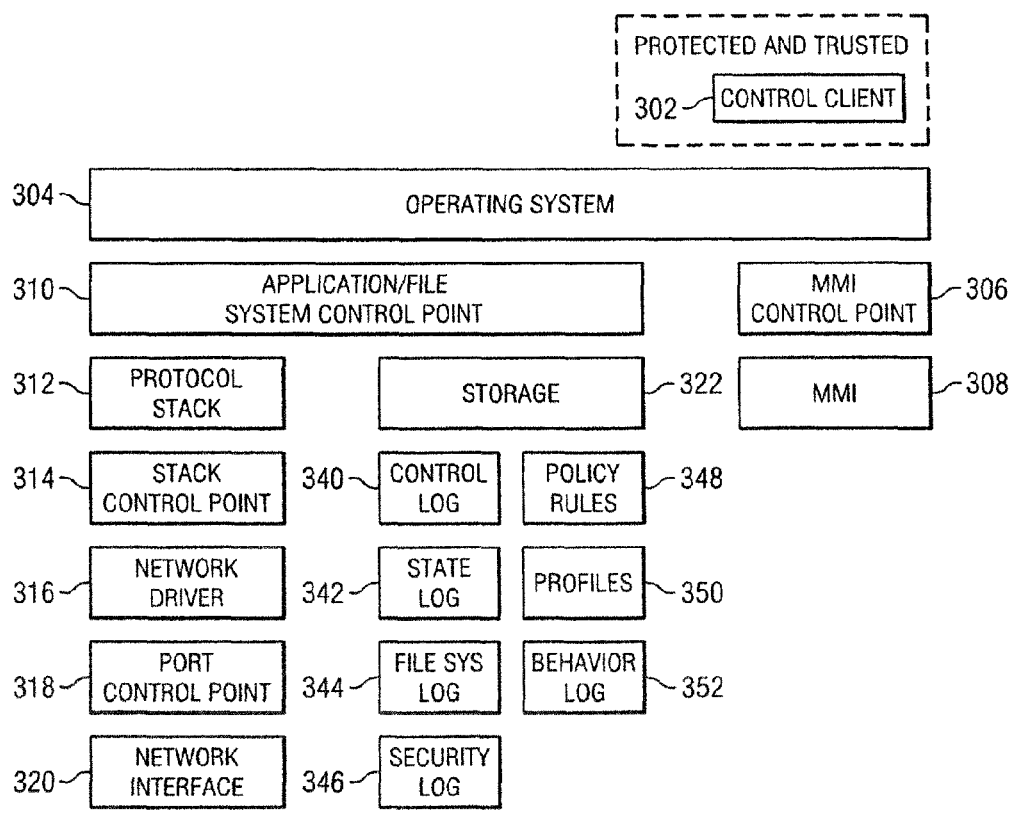
FIG. 2 provides a schematic, functional representation of how a control client may be integrated into a mobile device.

FIG. 2 illustrates how control client functionality may be integrated with a physical instance of a mobile device. In one implementation, the control client functionality may comprise a control client application 302 and one or more control points inserted to monitor data traversing the interfaces of the physical instance of the mobile device. For example, a man-machine interface (MMI) control point 306 can be inserted into the driver stack of the man-machine interface 308 to log keystroke data. An application/file system control point 310 can be inserted to monitor and log application level and file system commands. Stack control point 314 may be inserted in one or more network protocol stacks of the physical instance of the mobile device, while port control point 318 may be inserted at a different layer of the network protocol stack. One or more of the control points may be implemented as drivers that are installed in the appropriate driver stacks of the mobile device. In some implementations, the control points may emulate the operation of higher layer and/or lower layer drivers and pass data on to the lower or higher layer native drivers. In some implementations, a rule set may define what data is captured.

Control client application 302 may store the data collected by the control points in one or more log files stored on a storage device of the mobile device. For example, control client application 302 may store file system commands (such as open, save, delete, copy, rename, etc.) in file system log 344. Control client application 302 may store keystroke data in behavior log 352. Control client application 302 may store data relating to its own operation in control log 340.

The control client application 302 can provide some of all of the data to the remote management application server 104, which may synchronize the state of the virtual instance of the mobile device with the physical instance based on the data provided to it. In this manner, a central management server can, for example, maintain an accurate image of the data storage device(s) of the mobile device, including the applications installed and the files stored on the mobile device. The control client application 302 can operate to provide this data in real-time, intermittently during periods of non-activity (such as when the mobile device is inserted into a charging cradle), or at periodic intervals. Still further, the data may be provided to the remote management application server 104 during a synchronization operation between the mobile device and the user's personal computer. In a particular implementation, the synchronization utility hosted by the personal computer may be configured to transmit the data to the remote management server 104. In addition, the control client application 302 may operate in one to a plurality of modes based on a set of rules or policies. Still further, the control client application 302 may also apply a rule set that determines what data is provided to the central management server, and/or when such data is transmitted.

In one implementation, the control client application 302 and the remote management server 104 may establish encrypted connections. For example, Virtual Private Network (VPN) tunneling and encryption may be used to secure the connection. In a particular implementation, the physical instance of the mobile device may include port-based VPN functionality to encrypt the connection between the control client application 302 and the remote management server.

In some implementations, the physical instances of the mobile devices may include device management and/or data synchronization functionality. For example, the physical instances of the mobile devices may support the Open Mobile Alliance (OMA) Device Management (DM) protocol, and/or the OMA Data Synchronization (DS) protocol. OMA DM is a protocol specified by Open Mobile Alliance (OMA) for Device Management (DM) purposes, by the Device Management Working Group and the Data Synchronization (DS) Working Group. The current specification is OMA DM is version 1.2, which is incorporated by reference herein. OMA DM specification is designed for management of small mobile devices such as mobile phones, PDAs and palm top computers. The device management may support 1) provisioning (configuration of the device (including first time use), enabling and disabling features), 2) configuration (allowing changes to settings and parameters of the device), and 3) software upgrades (providing for new software and/or bug fixes to be loaded on the device, including applications and system software), and 4) fault management (such as reporting errors from the device, querying about status of device). The device management takes place by communication between a server (which is managing the device) and the client (the device being managed). OMA DM is designed to support and utilize any number of data transports such as a) physically over both wireline (e.g., USB, RS-232) and wireless media (e.g., GSM, CDMA, Infrared, BlueTooth), and b) transport layers implemented over any of WSP (WAP), HTTP or OBEX or similar transports. The communication protocol is a request-response protocol. Authentication and challenge of authentication may be incorporated to ensure the server and client are communicating after proper validation. The communication can be initiated by the OMA DM server, asynchronously, using any of the methods available such as a WAP Push or SMS. Once the communication is established between the server and client, a sequence of messages might be exchanged to complete a given device management task. OMA DM does provide for alerts, which are messages that can occur out of sequence, and can be initiated by either server or client. Such alerts are used to handle errors, abnormal terminations etc.

Several parameters relating to the communication such as the maximum message size can be negotiated between the server and client during the initiation of a session. In order to transfer large objects, the protocol does allow for sending them in smaller chunks. Error recovery based on timeouts are not specified completely, hence, different implementations could possibly differ as the protocol is not fully specified in these areas. The protocol specifies exchange of packages during a session, each package consisting of several messages and each message in turn consisting of one or more commands. The server initiates the commands and the client is expected to execute the commands and return the result via a reply message. Particular implementations of the invention may also use the OMA Data Synchronization (DS) protocols and functionality for synchronization of files and data between the physical and virtual instances of a given mobile device.

Using OMA DM or another suitable protocol, the control client functionality discussed above can be installed on a physical instance of a mobile device. For example, a mobile device without the control client functionality can be provisioned and configured as follows. In a preliminary step, an administrator may create a virtual instance of a mobile device with a minimal configuration. This virtual instance, prior to full configuration, may be quarantined—a state where the physical instance of the mobile device is not allowed access to the enterprise's internal network except for device registration and provisioning with the device management server. Suitable identifying information may include a device identifier, a user name, and the like. A user of the mobile device may then be directed to connect to the device management server 104 using, for example, a dial up connection, or a data connection with a WAP browser. The device management server 104, acting as an OMA DM server, may then interrogate the mobile device to learn one or more attributes (such as model number, serial number, operating system type and version, etc.), and provision and configure the mobile device. When the physical instance of the mobile device has been configured, the device management server 104 may further use the configuration and other information related to the mobile device to complete the virtual instance of the mobile device and remove it from quarantine.

The device management server 104 may also include other functionality, such as image and/or application software installation, upgrade and/or repair for one or more mobile devices. In one implementation, an administrator may select one or more virtual instances of respective mobile devices, and cause device management server 104 to transmit updated software applications, patches, and the like to the physical instances of the mobile devices. During installation of the software, the control client application may communicate the log data reflecting the changes to device management server 104, which results in changes to the virtual instance of the mobile device. In another implementation, the administrator may change one or more attributes of the virtual instance of the mobile device, which causes the device management server 104 to transmit commands to the physical instance of the mobile device to cause it to implement the changes made to the virtual instance of the mobile device.

The physical and virtual instances of the mobile device, through the control client, device management server, and the protocols described herein, can effect state changes, policy and other device management rules, and affect one or more behaviors in one or both directions. In one implementation, state changes or behaviors on the physical instance can cause corresponding state changes or behaviors to the virtual instance of the mobile device. In some modes, state changes resulting from execution, modification, re-configuration, etc. of the virtual instance may result in state changes to, or behaviors of, the physical instance of the mobile device. For example, an administrator may run the virtual instance of the mobile device (for example, to fix a problem the user is experiencing during a help-desk call) and trigger the device management server 104 to synchronize the resulting state and behavior of the virtual instance with the physical instance of the mobile device. For example, a mobile device user may watch the display screen of the physical instance of the mobile device, as a help desk operator controls the virtual instance of the mobile device to accomplish an action, such as retrieving a desired document, configuring an email client, and the like. The state and behavior information may be transmitted to the control client 302 which may implement the resulting changes. Furthermore, synchronization of state and behavior may operate in real-time. In other implementations, an administrator may change one or more policies by modifying the virtual instance of the mobile device and cause device management server 104 to synchronize the policy change with the physical instance of the mobile device at a later time.

In some implementations, the device management server 104 may be operative to proxy transactions, sessions and/or connections between the physical instance of the mobile device and other logical or physical nodes, such as enterprise application services, and the like. For example, in one implementation, the virtual instance of the mobile device may be used as a proxy, which accesses enterprise application 124. The resulting changes to device state, file system state and data that can be used to simulate user-observed behaviors on the display screen of the physical device instance can be communicated back to the physical instance of the mobile device and rendered on the display and otherwise effected by the control client 302. In other implementations, the device management server 104 may simply proxy the connection, and selectively transmit data messages from the enterprise application server (for example) to both the physical and virtual instances of the mobile device.

1.1.
B.3. Device Management Server—Virtual Instance System Architecture

Today mobile device management is difficult and challenging because the devices cannot be reached easily because of the networks they operate on. Embodiments of the present invention facilitate or provide an architecture that eases the device management, security and collaboration issues through an innovate architecture using virtualization. In a particular implementation, a virtual instance of mobile device running in a network performs resource intensive process, and passes the results of that processing (e.g., through synchronization and other data transfers) to the physical instance of the mobile device. In this manner, the user experience may be improved on the mobile device.

Figure 6:
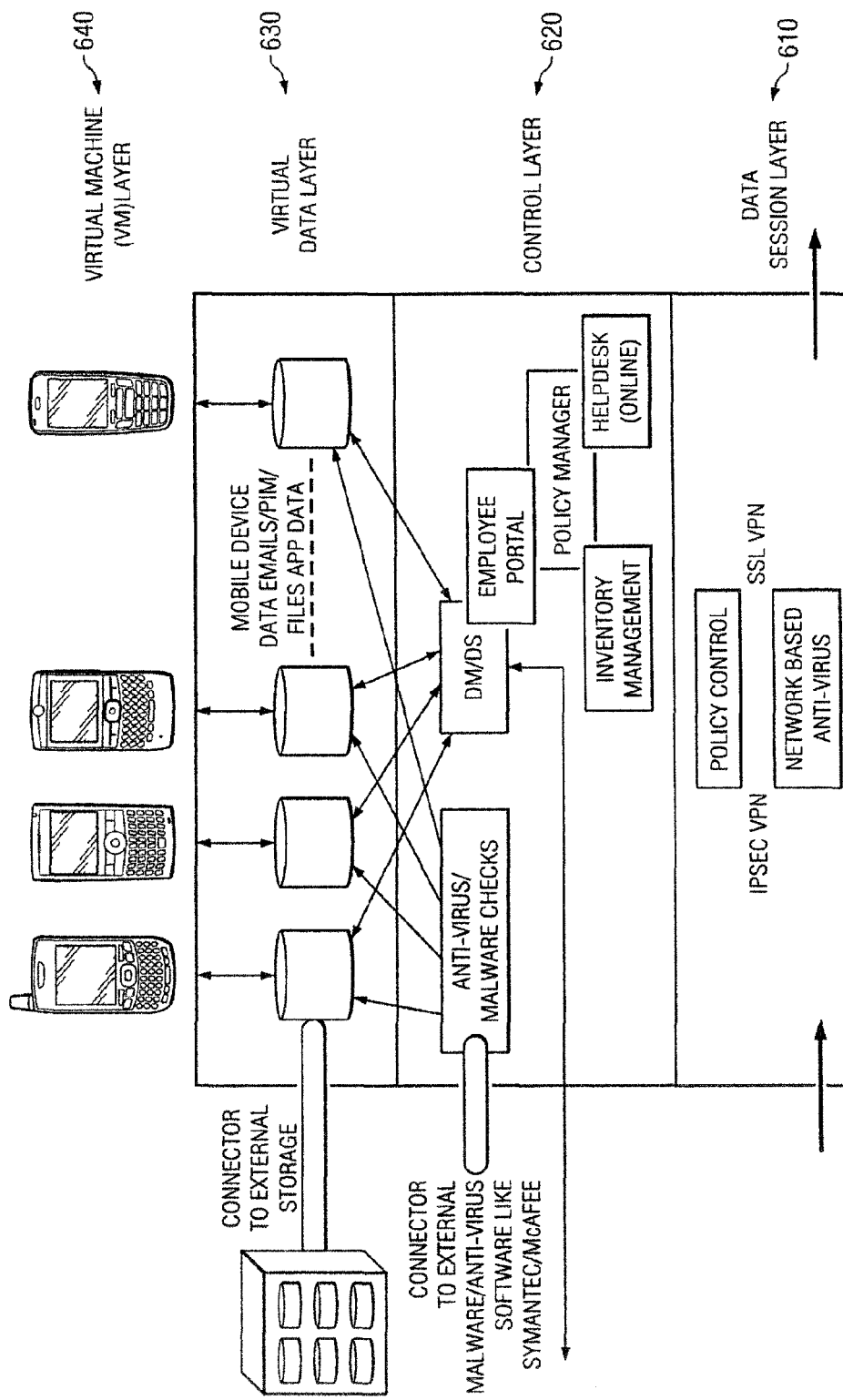
FIG. 6 is a diagram illustrating example device virtualization layers.

FIG. 6 illustrates an example mobile device virtualization architecture according to one possible implementation of the invention. The virtualization architecture comprises four functional layers. Depending on the functionality or the task to be performed, one or more of the function layers may be used to perform a given operation or task. The four layers are session layer, control layer, virtual data layer and the virtual machine/instance layer.

Data Session Layer 610

Data session layer 610 is responsible for handling data session related functions. This layer acts as a proxy for all the session traffic going between the mobile devices and the application servers. Services like IPSEC VPN, SSL-VPN, Firewall or Network based Anti-virus functions are hosted in this layer. Data session layer 610 can maintain a session table for all the traffic to steer the traffic appropriately.

Control Layer 620

Control layer 620 is the main layer where most control functions are hosted. Policy settings, device management, data synchronization, and anti-virus engine run in the control layer. For example, control of the data is implemented in this layer.

Virtual Data Layer 630

Virtual data layer 630 is where the copies of the mobile device data are maintained. Data synchronization service in the control layer will synchronize the data between the mobile device and the virtual data layer copy of the mobile device data. OMA DS standard can be used for the synchronization services. Anti-virus running in the control layer can work on this virtual data to provide the anti-virus functionality to the end device. If the anti-virus service finds any abnormality then the device will be put into quarantine mode until the virus has been cleaned on the actual device.

Virtual Machine (VM) Layer 640

VM layer 640 is the layer where the virtual instances of the client devices reside. The virtual instances 102b are executing replicas of the actual mobile devices 102a exhibiting substantially the same behavior and functionality. These virtual instances need not run all the time and can be brought up and down depending on need. This VM layer 640 may execute on top of virtual containers or virtual machine monitors, provided by companies like XenSource™ or VMware or KVM (Kernel Virtual Machine). As discussed below, the VM layer 640 can be configured in at least two ways: full hardware and software emulation of the mobile phone, or software-only emulation.

B.3.a. Virtualization—Full Hardware & Software Emulation

Figure 7:
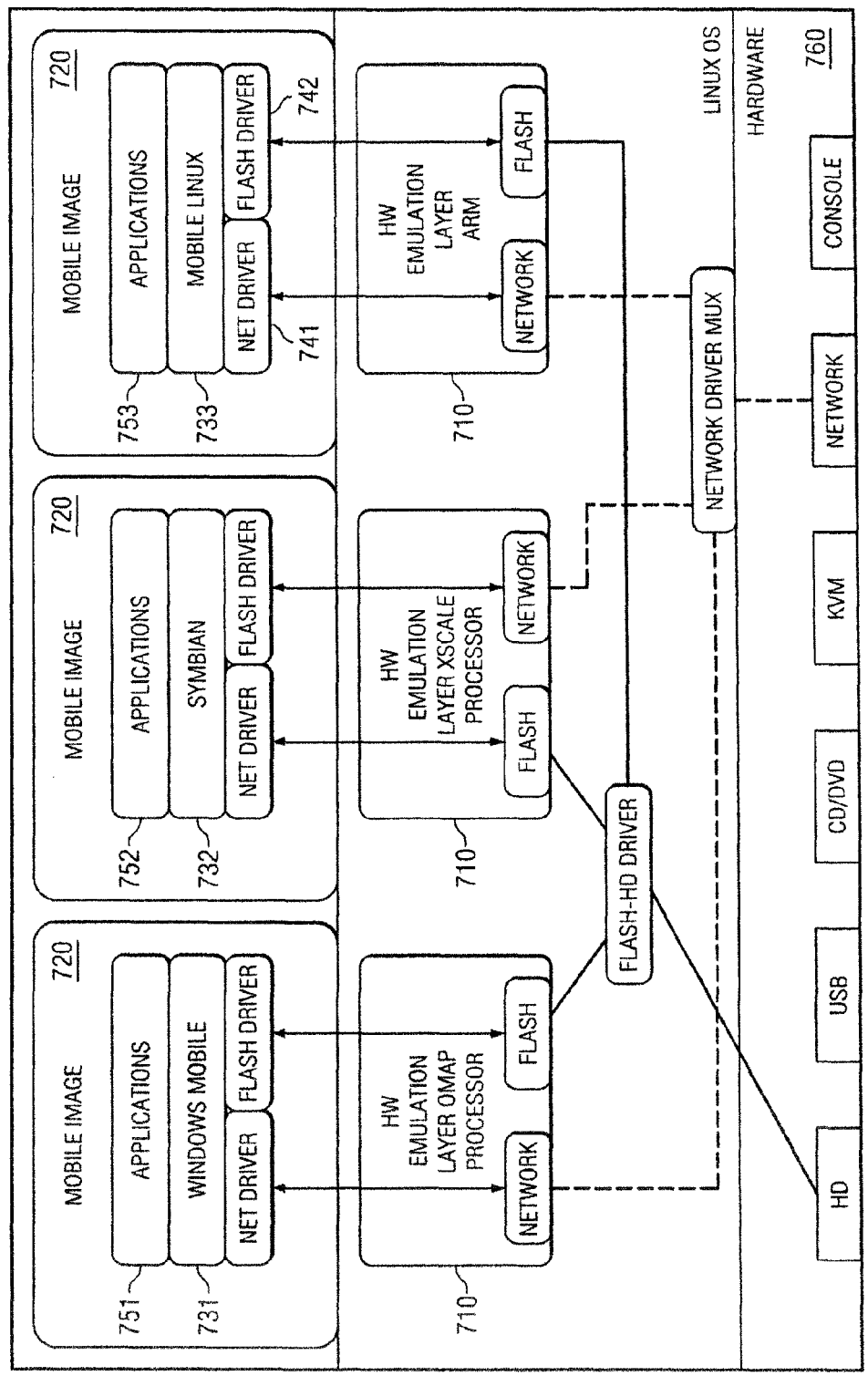
FIG. 7 is a diagram illustrating mobile device virtualization functionality.

Virtualization layer, in one implementation, includes functionality that virtualizes substantially the entire physical instance of a mobile device including the hardware and software. In this implementation, the mobile device image can be extracted from the mobile device and run in the virtual machine layer. In such an implementation, the virtual machine layer includes hardware emulation functionality. For example, the mobile device processor instruction set could be x86, ARM or some other instruction set that supports or emulates the processor that the mobile phone is running FIG. 7 illustrates a virtualization architecture according to one implementation of the invention. In a particular implementation, the virtualization layer includes, for a given mobile device, a hardware emulation layer 710 (including network and storage device emulation), and software emulation layer 720 (including operating system 731, 732, 733, virtual device drivers 741, 742, and one or more applications 751, 752, 753). The bottom layer 760 is the hardware layer of the host (in one implementation, device management server 104). In a particular implementation, a native operating system, such as Linux, runs on top of the hardware layer. In the native operating system, virtual containers will be created for the virtual mobile devices to run. In the virtualization system, the hardware emulation layer 710 includes communication layers for network and storage (e.g., Flash memory) systems. Flash driver mux and network driver mux act as the gateway for all the network and memory related activities associated with the virtual instances.

Hardware Emulation Layer 710

Hardware emulation, in one implementation, features bit to bit emulation of the real hardware for the mobile device image to run. In this model the software image is not modified or changed to run in the virtual instance and that means whatever the hardware that the mobile phone has for which the image has been built is to be emulated exactly in the device management server 104. Hardware emulation functionality will typically vary with the many different hardware models. Depending on the mobile device, the corresponding hardware or processor chip is emulated in the appliance. To reduce the work on the virtual instance, a subset of the hardware can be virtualized, such as the processor, memory model and other important peripherals like flash, bootrom, etc. In one implementation, the choices as to what aspects are virtualized are application-driven. In other words, since management of applications is important, any hardware that is required to support the applications can be virtually emulated. For example, two aspects that almost all applications require are network access and flash space to store the data. Virtualizing other hardware components like WiFi, GPS, GSM, Camera, Speakerphone etc., in the virtual instance is optional and may depend on the applications supported by device management server 104. In addition, a virtual instance of a mobile device may include all or a subset of the applications installed on a corresponding physical instance of the mobile device.

The hardware emulation layer 710 usually include various hardware emulation components or modules, each of which corresponding to one or more pieces of hardware of the physical instance of the mobile device to which the virtual instance corresponds. For example, the hardware emulation layer may include a processor emulator that emulates the processor of the corresponding physical instance of the mobile device, a memory emulator that emulates the memory storage or subsystem of the corresponding physical instance of the mobile device, a network interface emulator that emulates the one or more network interfaces, e.g., WiFi, Bluetooth, etc., of the corresponding physical instance of the mobile device, an input/output (I/O) emulator that emulates the one or more I/O devices, e.g., keypads, wheels, sliders, buttons, etc., of the corresponding physical instance of the mobile device, a display emulator that emulates the display screen on the corresponding physical instance of the mobile device, etc. Each emulator imitates or duplicates the behavior of the piece of hardware it emulates. It generally maintains the look, feel, operations, characteristics, behavior, etc. of the original pieces of hardware.

There are a variety of different ways to implement the individual emulators or modules included in the hardware emulation layer. According to one implementation, the emulators or modules are implemented as computer-executable programs, represented by computer program instructions stored in various forms of computer-readable media. For example, one way to emulate the processor of a physical instance of a mobile device is to use an interpreter, which follows the execution flow of the program code and, for every machine code instruction encountered, executes operations on the processor(s) of the device management system that are semantically equivalent to the original instruction. Some prepackaged CPU simulators may also be incorporated into the process emulator. A way to emulate the memory storage of a physical instance of a mobile device is to use an array of elements, each corresponding to a memory location within the memory storage on the physical instance of the mobile device. The hardware emulation programs may be loaded into a computer runtime environment for execution in order to emulate the operations and/or behaviors of the hardware components of the corresponding physical instance of the mobile device for which these programs emulate.

According to one implementation, the hardware emulation layer 710 is a part of a virtual mobile device platform. The device management server causes the hardware emulation layer of a virtual instance of a particular mobile device to be executed when there is a need to emulate one or more pieces of hardware of the corresponding physical instance of that mobile device. For example, when the device management server 104 emulates the software operations of the physical instance of a particular mobile device, it first loads the hardware emulation layer of the virtual instance of that mobile device and then executes a copy of the software of the physical instance of the mobile device within the context of the hardware emulation layer.

Software Emulation Layer 720

To emulate the software components of a physical instance of a mobile device, according to one implementation, the corresponding virtual instance of the mobile device includes a software emulation layer, which includes a copy of the operating system, one or more device drivers, and/or one or more applications on the physical instance of the mobile device. For example, application software on a mobile device may include email, messaging, calendar, task list, address book, device settings, etc.

The software may be executed within the context of the hardware emulation layer of the virtual instance of the mobile device as described above to replicate the behavior, operations, and/or characteristics of the same software being executed on the corresponding physical instance of the mobile device. For example, to emulates a specific piece of application software, the device manage server 104 first causes the hardware emulation layer to be loaded and executed, and then causes the copy of the piece of application software from the software emulation layer 720 to be executed on top of the hardware emulation layer 710, i.e., interacting with the hardware emulation layer 710, thus imitating the piece of software being executed on the physical instance of the mobile device and interacting with the actual hardware components.

Flash and Network Driver 741, 742

In a physical instance of a mobile device, communications occur through the GPRS stack or WiFi stack. Device management server 104 hosts virtual hardware for storage and network hardware components. Custom drivers may be built for this virtual hardware which resides in the device management server 104. In one implementation, the drivers for these virtual hardware devices are installed on the physical instance of the mobile device as well so that the virtual drivers become part of the software image on the mobile device. These two drivers have no function in the actual mobile phone as there is no hardware corresponding to those drivers and hence they will not be loaded. When the software image is extracted and run in the virtual instance, however, all other drivers will fail (not be loaded) except the virtual drivers because there is no real hardware emulation for devices like GPS, WiFi, GSM, Speakerphone, etc. Virtual drivers will find the virtual hardware, like network and flash, so they will attach themselves to this virtual hardware. The network driver provides the glue to the communication between the virtual instance and the device management server 104 and similarly a virtual Flash driver will provide the glue for virtual instance flash layer and the data storage attached to or available to device management server 104.

Communication

The communication between the virtual instance and the device management server 104 happens through the two main drivers, virtual network driver and the flash driver. Virtual network driver of each virtual mobile device communicates with the virtualization layer network driver (Network Driver Mux) of device management server 104 through the network hardware emulation functionality. The network driver of the virtualization layer of device management server 104 acts as a multiplexer in the sense it will communicate with all the virtual instances and the actual network interface(s) in the device management server 104. There can be two types of communication that can happen between a virtual instance and the outside. One is the virtual instance talking to the device management server 104 and other is that the virtual instance talking to remote devices and hosts. Since the device management server 104 has full control of the virtual instances and the virtual instances communicate through the device management server 104, device management server 104 can act as a gateway for the virtual instances. Device management server 104 may have a DHCP service running where it can assign the IP addresses to the virtual instances as they become live and the device manager's IP address can be configured as the gateway IP address for the virtual instances. For all the communication that can happen between the virtual instance and the outside devices, device management server 104 can act as the NAT gateway so that there is no need to assign routable IP addresses to the virtual instances. For any communication that originates from outside, first the user authenticates with the device management server 104 and then indicates to which virtual instance they want to connect. Based on the user credentials, device management server 104 can grant access to the virtual device.

B.3.b. Virtualization—Software Only

In another implementation, the virtual instance replicates the application environment of the physical mobile device, but does not replicate the hardware functionality of the actual device. Device management server 104, in a particular implementation, maintains a repository of operating systems (like Windows Mobile 5.0, Windows Mobile 6.0 or Symbian 7.1, and/or Linux versions) and a repository of applications (like salesforce.com, RSS reader etc.,) that can be installed on these operating systems. When a new mobile device is registered with device management server 104, it can query all the details of the mobile device including the operating system, applications installed, memory profiles etc., either through OMA DM or via an installed client on the mobile device. Device management server 104 maintains this info in its database on what applications are running on the device and on what operating systems. As applications are installed or removed, this information is updated throughout the life of the mobile device to be able to create an accurate virtual instance of a mobile device.

Applications

The device management server 104 monitors the physical mobile devices (either through the client installed on the actual mobile device or through OMA DM queries) for application installations or removals from the actual device so that the same behavior can be replicated in the virtual instance. A new application can be installed on a mobile device in multiple ways. One way is that the user installs the application or the application has been installed through some automated way like OMA DM functionality. Through software and patch management functionality, new software can be installed on the mobile devices without user intervention. In both cases (either the user initiated installation or automated installation), the new application installation information is pushed to the device manager via a client installed on the mobile device. The newly installed application software is also maintained in the application repository in the device manager so that the device manager can use it to create the virtual instance of the actual mobile device. This application software can be made available to the device management server 104 in multiple ways. One way is to provide the link on where the software is available and another way is that the administrator will download the application to the repository. Every time there is a change in the software version or new software has been added, one of the above methods is used to acquire the software. The device management server 104, in one implementation, acquires application software prior to installing the software on the actual device so that the virtual device can be created with all the applications in time. These applications may have been developed to run on the operating system directly or a common platform like J2ME etc., If the applications run directly on the operating system then there will be different versions of the software for different operating systems and if the applications are written for platforms like J2ME then the same version of the application can be run on all operating systems. Both types of applications are supported in the device manager application repository.

Operating System Versions

Device management server 104 maintains copies of all the operating systems used in the mobile devices under management so that the device manager can create virtual instances of the actual mobile devices. In a particular implementation, the operating systems are compiled to a common processor or hardware instruction set. The repository of the operating systems can be collected, maintained and distributed by a central service provider for all the companies (something similar to the distribution of virus definitions). Whenever ISVs (Independent software vendors like Microsoft Corp or Symbian) release a version of an operating system, the service provider can download the operating system and keep it in its distribution server. All the device management servers 104 can be equipped with software download managers configured to talk to the software distribution server. Whenever there is new software being added to the distribution servers, all registered download managers can be notified of the availability of the new software. The download managers can be configured to download the software automatically or with user consent.

Virtualization Layer

Virtualization Layer includes functionality operative to create and maintain multiple virtual instances in the device management server 104. All the different operating systems that are compiled for the same instruction set as the device manager (for example x86) can be directly run on the host operating system (like Linux). For creating this type of virtualization an existing virtualization technology (like XenSource™ or Virtual Iron®) can be used. If the operating systems are compiled for another instruction set like ARM (which is more popular in the mobile device world) then a JIT conversion mechanism (like QEMU, a device emulator layer where ARM instructions will be converted to x86 instruction in run time) can used in between the guest operating systems (guest operating systems are those which run in the virtual instances) and the host operating system virtualization layer.

Further to the applications that are installed on the actual mobile device, one or more virtual drivers may be installed in the virtual instance so that the virtual instance of the mobile can communicate with other devices. Examples of those virtual drivers are virtual network driver and virtual flash driver. Virtual network driver is installed along with other applications in the virtual instance so that the virtual instance can communicate with actual mobile device and other hosts (such as enterprise applications and the like). In this approach, the virtual network driver can be assigned an IP address to communicate in and out of the virtual instance. This virtual network driver will provide the communication layer for the TCP/IP stack in the operating system. Other drivers installed on the virtual instance include the flash and memory driver. Any mobile device will have DRAM, ROM, Flash and/or external Flash. The boot-code typically is burnt on to ROM, while the operating system and applications are burnt onto Flash. Some applications may reside on an external Flash disk. The virtual flash driver, in one implementation, emulates Flash or other memory in the actual mobile device so that the applications can be installed the same way they are installed in the actual mobile device.

Building and Invoking Virtual Instances

To build a virtual instance, device management server 104 queries the actual mobile device to get configuration information regarding the processor, memory, operating system and applications. This information is used in modeling the virtual instance. After querying the information, device management server 104 will make sure it has enough memory to host the virtual instance, and that it has the operating system and necessary applications in its repository. Additionally, the data stored on the physical instance of the mobile device will be backed up from the actual mobile device for creating the virtual instance. For example, to create the similar environment with the applications as the actual mobile device, all the application data is maintained. If any of the information is missing or the device management server 104 does not have necessary components to build the virtual instance, then it will abort creating of the virtual instance and report an error to the administrator so that the administrator can take action. If all the components are available, then device management server 104 creates the memory model similar to the actual device and then brings the operating system up. A map of the actual mobile device's applications and the corresponding data is maintained so that the right data can be copied to the right location in the virtual instance so that the application will behave the same way it behaves in the actual mobile device. After the guest operating system comes up all the applicable applications are installed on top of the guest operating system.

This installation can be done similar to the actual device where a protocol similar to OMA DM is used. In this case the virtual instance and the device management server 104 communicate through OMA DM protocol to install the applications. After the applications are installed the application data is copied to the right locations so that when the applications are invoked in the virtual instance, they behave with the same properties as they would in the actual mobile device. When the application installation is done, the entire model (or image) is recorded and kept in the database including the operating system and its registry. This way next time the same virtual instance needs to be brought up, it can be brought up with out going through the same installation steps as the first time. In case of error, a provision may be provided for the administrator so that he/she can build the virtual instance by picking the operating system and the applications from the repository manually. To see the progress for administrators, a remote session is established to the virtual instance so that administrators can fix any problems that may arise during the installation process. For accomplishing this, all I/O traffic is captured and redirected to the administrator's console. A small run time client is installed in the virtual instance to capture the input and output and redirect it to the administrator's console. Based on the captured output from the virtual instance, a rendered image of the virtual device can be created in the device manager's management tool where the administrator can input the commands and see the output. This way the administrator can fix any issues that may arise during installation time.

In another implementation, a software client similar to the one that runs on the actual mobile phone may run inside the guest operating system to synchronize the data between the virtual instance and the device management server (the data that is synchronized with the actual device). In this model the applications (including executables) can be copied as well to run in the virtual instance of the mobile.

Communication between Virtual Instance and Device manager

Communication between the virtual instance and the device manager happens through two main drivers, virtual network driver and the storage (flash) driver. Virtual network driver communicates with the virtualization layer network driver. As above, the virtualization layer's network driver acts as a multiplexer in the sense it will communicate with all the virtual instances and the actual network driver in the device management server 104. There can be two types of communication that can happen between a virtual instance and outside. One is the virtual instance communicating with the device management server 104 and other is the virtual instance communicating with remote hosts. Since the device management server 104 has control of the virtual instances, device management server 104 can act as a communications gateway for the virtual instances. Device management server 104 may host a DHCP service where it can assign IP addresses to the virtual instances as they become live. In such an implementation, the device manager's IP address can be configured as the gateway IP address for the virtual instances. For all communications that can happen between the virtual instance and remote hosts, device management server 104 can act as the NAT gateway so that there is no need to assign routable IP addresses to the virtual instances. For any communication that originates from outside, the user authenticates with the device management server 104 and indicates to which virtual instance they want to connect. Based on the user credentials, device management server 104 can grant access to the virtual instance of the mobile device.

C. Uses of Virtual Instance of Mobile Device

Maintaining a virtual instance of a mobile device at a management server facilitates a variety of configuration, management, troubleshooting and/or security functions. For example, the virtual instance provides an administrator a detailed snapshot of the state of the mobile device. The virtual instance also allows for the administrator to perform management operations, such as virus/malware scans, application/image certification, etc., on the virtual instance of the mobile device, without consuming computing resources of the physical instance of the mobile device.

C.1. Offline Virus-Scanning

In a particular implementation, virus scanning or detection functions can be executed on the virtual instance of the mobile device without consuming the resources (e.g., battery, processor, memory, etc.) of the physical instance of the mobile device. Given that the virtual instance of the mobile device is hosted on a more capable processing platform with more available resources (e.g., memory, processors, etc.), robust virus scanning and detection functions can be applied. Furthermore, given that the virtual instance of the mobile device is executable within the virtual environment, the virus scanning or detection functions can operate to invoke execution of one or more operations within the virtual execution environment to possibly detect polymorphic virus code by essentially using the virtual instance of the mobile device as an emulator. Furthermore, if a virus or malware is detected, device management server 104 can operate to place the affected mobile device under quarantine, restricting access to the enterprise network. Moreover, the device management server 104 may remove the malware or virus from the physical instance of the mobile device and/or install a patch to one or more applications hosted on the mobile device, as well.

C.2. Action Replay

The virtual instance of the mobile device and the logged usage data provided by the control client application 102 can also be used to replay a sequence of user actions. This can be useful for diagnostics and troubleshooting. For example, a help desk administrator could replay a last N set of operations to determine what actions a user has taken prior to a trouble report. This also may be useful to security as the logged data can reveal what files or data were transferred from one or more network interfaces of the mobile device.

C.3. Modifying Application Settings

A user reports that a particular application is not working in his mobile device environment, and logs a case with the administrator. The administrator logs into the device management server 104 and initiates the virtual instance of the user's mobile device. If the application data associated with the virtual instance is not latest, the administrator issues a synchronize command to synchronize the application data with the actual mobile device. Using the virtual instance, the administrator opens up the application, fixes the problem and saves the application or other device configuration settings. The settings are saved in the virtual instance. The administrator issues a synch command and the modified application data gets pushed to the actual mobile device. The user opens up the application and sees the problem is fixed. During this whole process the user is not locked up and he/she can work normally with the mobile device.

C.4. New Application Roll-Out

Before a new application is rolled-out, it can be checked on the virtual instance first to make sure the application can fit into the memory of the physical mobile device and does not create undesirable behavior or interoperability issues.

C.5. Problem Diagnosis, Device Maintenance and Helpdesk Support

A user reports a problem with an application installed on her mobile device. Before dispatching someone to look at the problem, the administrator can log into the virtual instance of the mobile device, and figure out if the problem is a software issue or a hardware issue. This helps the user diagnose the problem quickly, thereby saving time in fixing the issue.

Embodiments of the present invention can provide a solution to fix problems on the mobile devices remotely. Currently, the mobile device needs to be dedicated to an IT person to fix most problems. During this time, the user cannot use the device. With the virtualization architecture, the helpdesk functionality can be improved considerably. There could be two types of problems that a user may encounter—software problems or hardware problems. There are two solutions that will address these problems. In both the cases the administrator can remotely login and access the mobile device through the web portal provided by the device management server 104. Support functions can operate in an offline or an online mode.

Device Offline support

Figure 10:
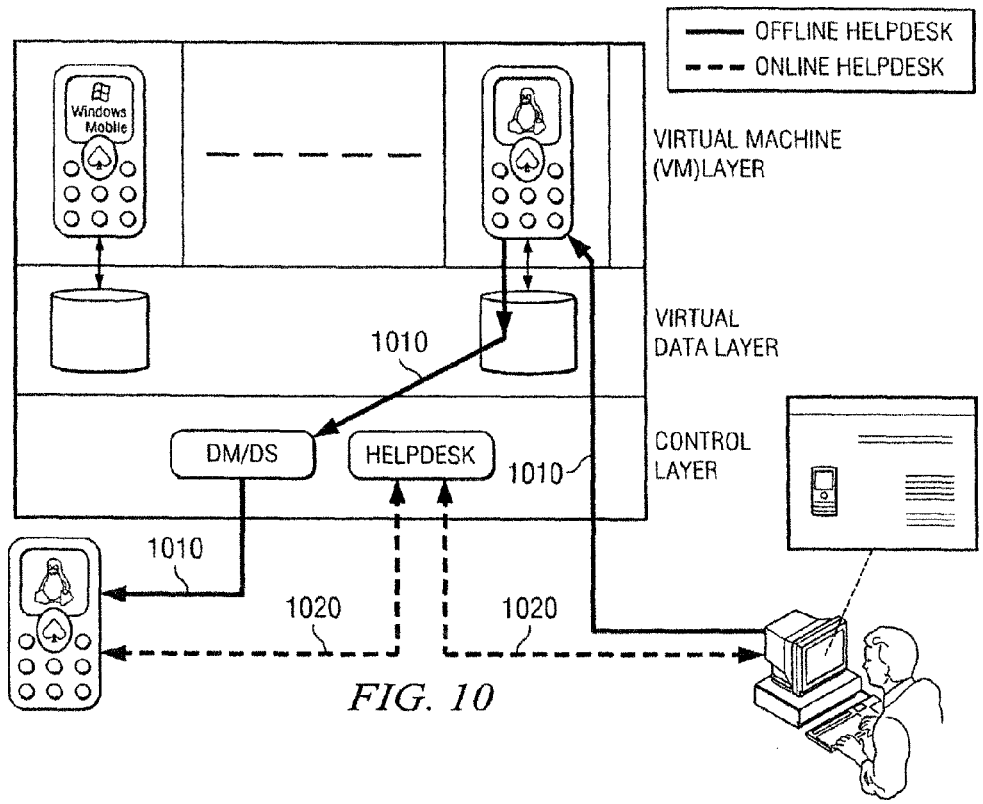
FIG. 10 is a schematic diagram illustrating mobile device support functions.

In the offline support model, when there is a problem the user will log the problem with the IT department. The IT person will log into the device management server 104, bring up the virtual instance and identify the problem. If the physical instance of the mobile device is not synchronized with the virtual instance, then device management server 104 may trigger a synchronization. In the offline model, the IT person may attempt to fix a problem by access the virtual instance and modifying its configuration (e.g., settings, application versions, drivers, patches, etc.). The modified configuration data will be pushed to the mobile device and the user sees the problem fixed. The blue solid line 1010 in FIG. 10 illustrates the communication path. During the whole process the user does not need to dedicate the device for the administrator to fix the problem.

Device Online Support

In the online support model, when there is a problem the user and administrator will negotiate a time to fix the problem. The user will load a small application (if not already installed) which will capture the I/O of the mobile device and redirect it to the device management server 104, which sends the data to the administrator's web console. The web console can provide a similar skin as real mobile device so that the administrator can work on the device as if he is working on the actual device. During this time the mobile user cannot use the device and it will be fully under the administrator's control. The red dash line 1020 in FIG. 10 illustrates the communications path for the online support mode.

C.6. Patch Management

Figure 11:
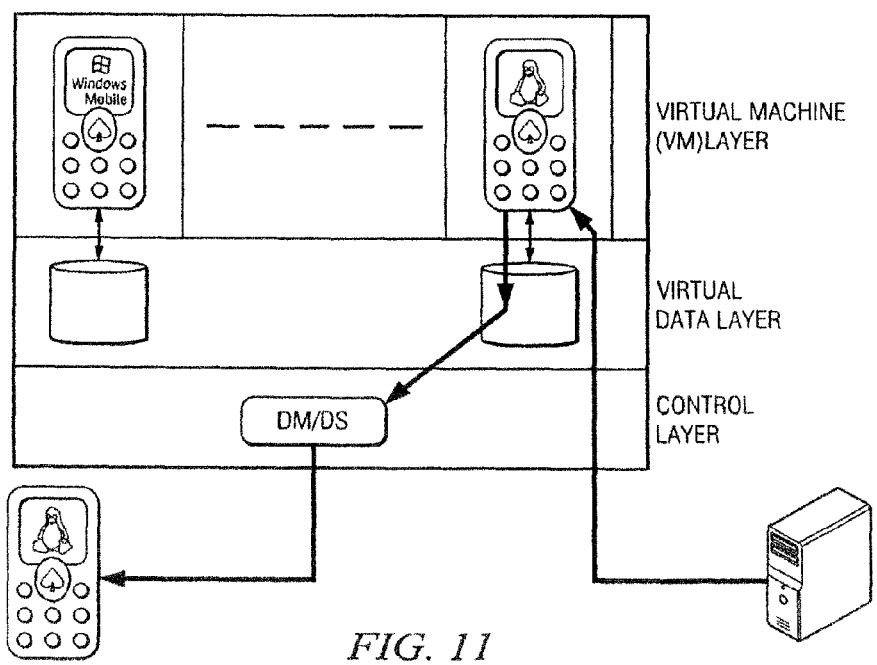
FIG. 11 is a schematic diagram illustrating patch management functions.

FIG. 11 illustrates operation of patch management functionality according to one possible implementation of the invention. Patches can include firmware upgrades and software updates. Before delivering the patches to the actual devices, the patches can be tried and tested in the virtual instance and then deploy them to the actual mobile device to minimize their impact on the actual device. For example, software patches can be first tried and tested in the virtual instance before deploying the software patch on the actual device. Every time a patch is applied, the current image (prior to the patch) can be backed up so that in case if the patch creates problems, the backed up image can be used to bring back the previous state.

C.7. User Portal

Figure 12:
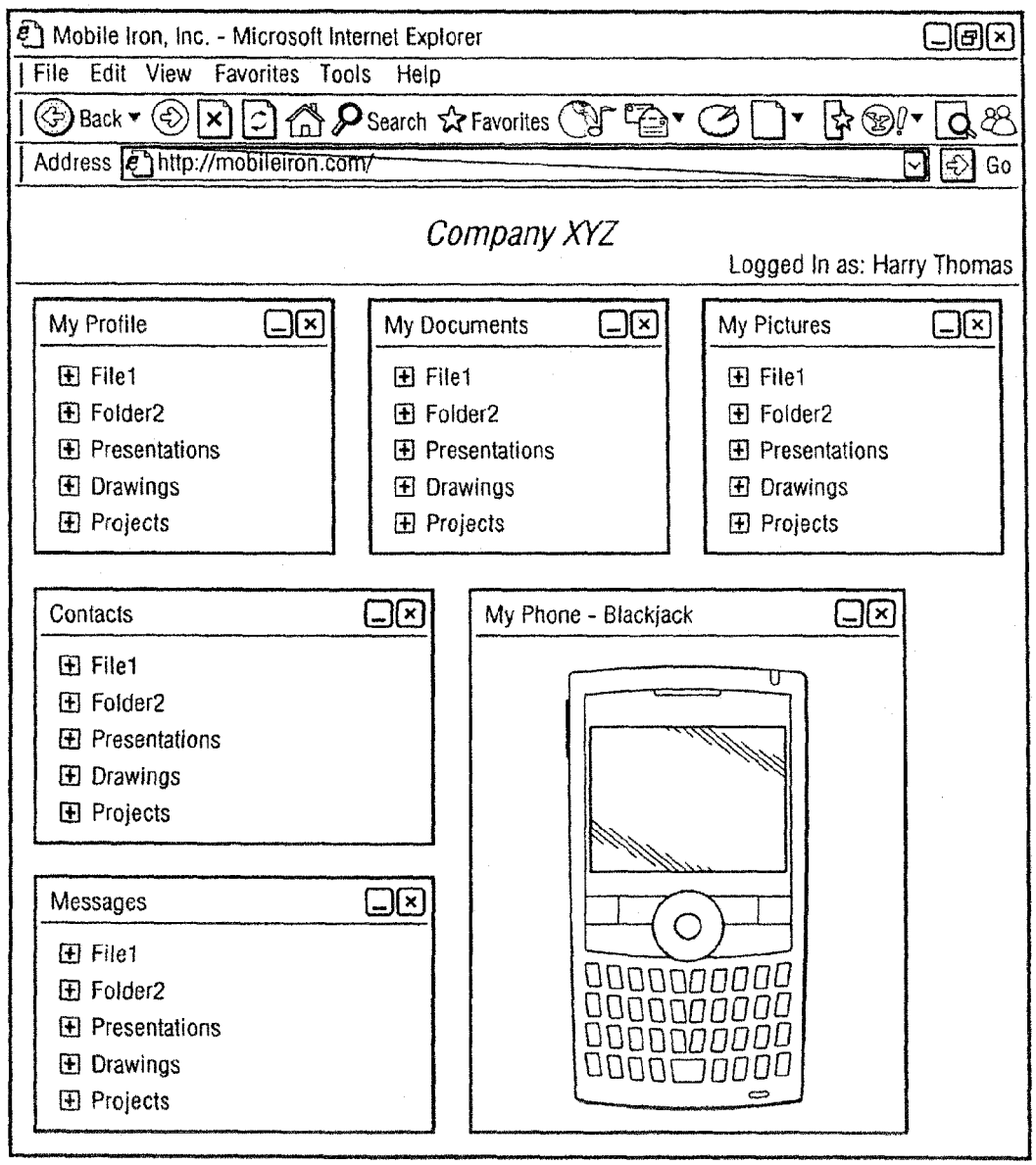
FIG. 12 provides a user portal interface.

Users can access a web portal of device management server 104 and access information regarding one or more mobile devices. In the mobile device, only one screen can be seen at a time where as in the portal all the relevant information can presented in one screen to the user. The user can download or upload or share the data from the web portal. Apart from accessing the data, the user can also perform some functionality like locking the device, locating the device (if GPS enabled) and wiping the data in case of the device being lost. An example screen is shown in FIG. 12.

1.2.

C.8. Document Collaboration: (File Sharing, Printing, Email)

Figure 13:
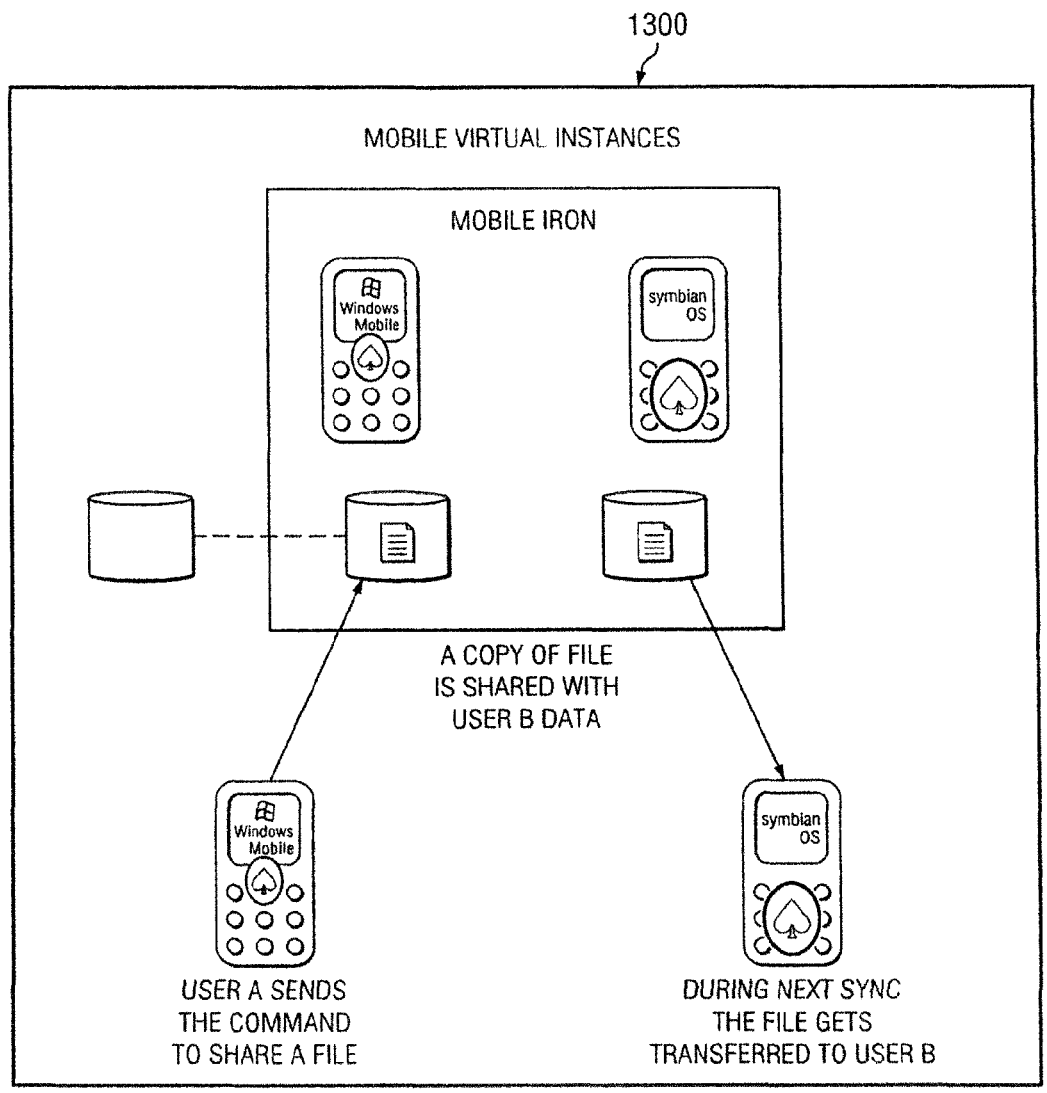
FIG. 13 is a schematic diagram illustrating document collaboration functions.

FIG. 13 illustrates operation of document collaboration functionality that can be implemented in connection with device management server 104. Since the data associated with a mobile device is backed up and available in connection with the virtual instance 1300 hosted by the device management server 104, users when they want to share a document, can just send a command from the mobile device 102a which will instruct the device management server 104 to do the necessary action. The user can select the file and select share, print or email commands. With this approach the user does not need to send the document from the actual mobile device 102a reducing bandwidth requirements and saving air access time. In another implementation, the users can map their network files with device management server 104, which can show those file names to the user on the mobile device. The user can then browse and select a file to download or share with other users without downloading the actual file to the mobile device, again achieving savings in terms of bandwidth and air time consumption.

C.9. Application Proxy Mode

Figure 5:
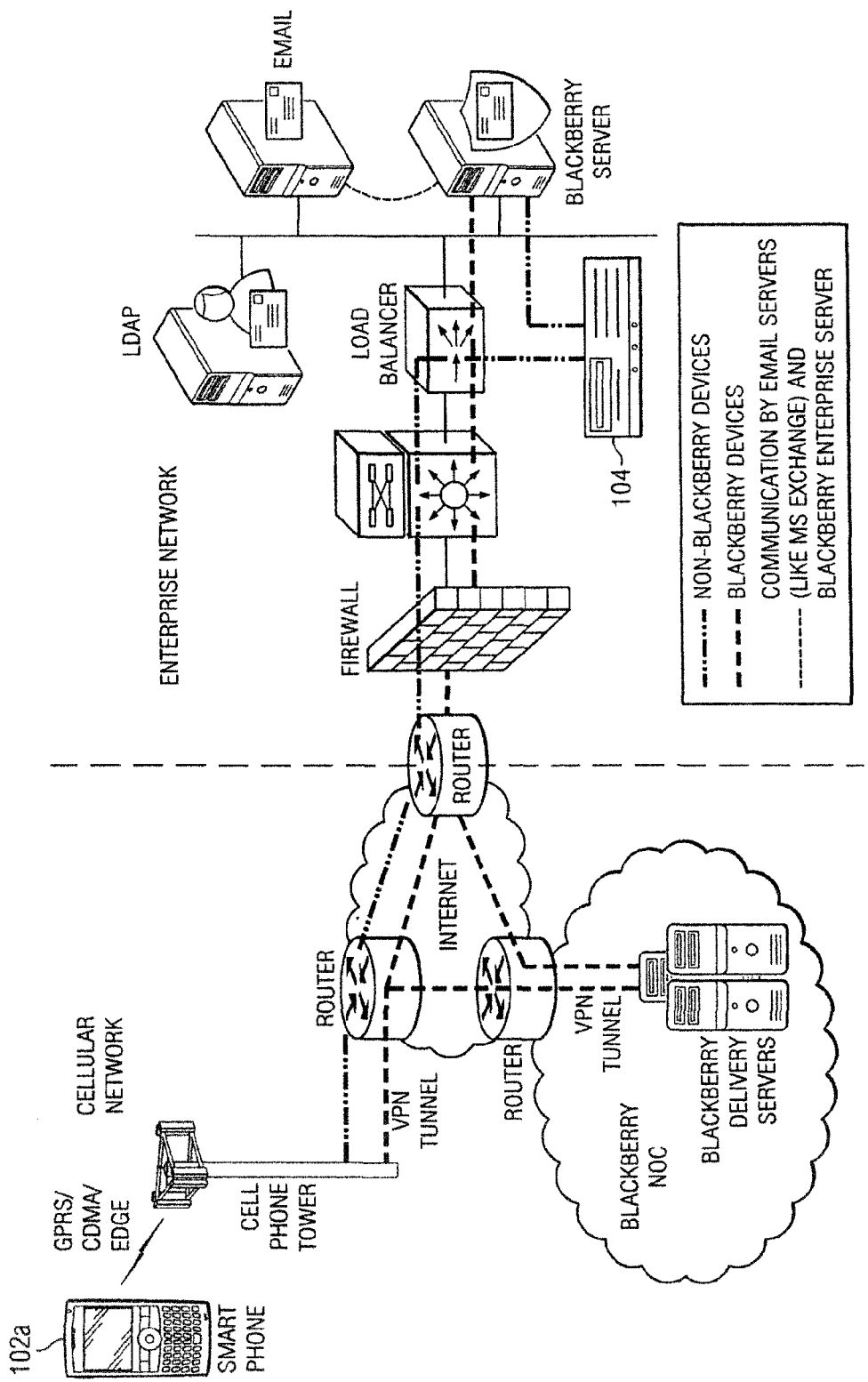
FIG. 5 is a schematic diagram illustrating example application proxy functions.

FIG. 5 shows an example deployment of device management server 104 in a proxy mode, where device management server 104 proxies sessions between mobile devices 102a and one or more enterprise applications. Device management server 104, when acting as a proxy device, can proxy the applications so any specific environments (like BlackBerry®) can be generalized so that any device can be used for that specific environment. For example, device management server 104 can act as a BlackBerry® device to the BlackBerry® network service environment for non-BlackBerry® mobile devices. Also the proxy service benefits the users when they want to migrate to another environment different from their current one. In the example illustrated in FIG. 5, device management server 104 is acting as a proxy for a BlackBerry® (or other mobile email) service. BlackBerry® service requires all mobile traffic to hit their Network Operations Center (NOC) first before entering the enterprise network. A typical BlackBerry® solution includes Blackberry enterprise servers, and a BlackBerry® gateway in the NOC. All the traffic going in and out of mobile clients will first hit the mobile gateway in the BlackBerry® NOC before going anywhere else (including internet destinations). They provide the end to end security from mobile client all the way through the enterprise email servers and that is how they provide the confidentiality to the enterprise user traffic. Any traffic destined to the internet will first go to the BlackBerry® NOC and then goes to the final destination from there. In the above figure, the red line indicates the traffic flow in a BlackBerry® environment, and the blue line indicates the normal traffic flow. To provide the BlackBerry® services to the normal users, one can deploy device management server 104 as an Application Proxy server. In this case, all the BlackBerry user traffic will directly go between the BlackBerry enterprise server and the BlackBerry gateway in NOC. All the traffic from non-blackberry devices will go through the device management server 104 device for Blackberry services.

D. Example Mobile Device and Server System Architectures

D.1. Example Server System Architecture

Figure 3:
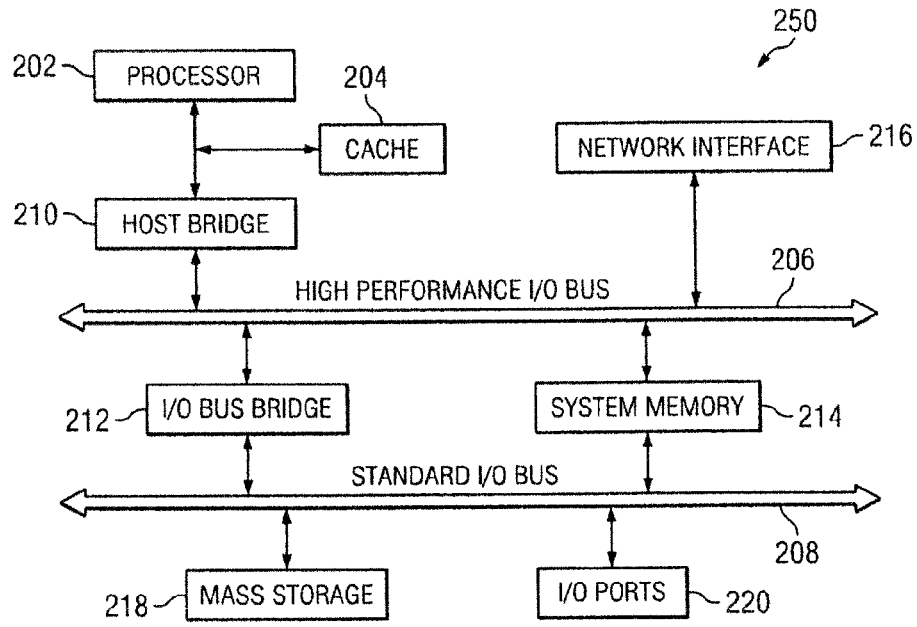
FIG. 3 is a schematic diagram illustrating an example server system architecture.

FIG. 3 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

D.2. Example Mobile Device Hardware Architecture

Figure 4:
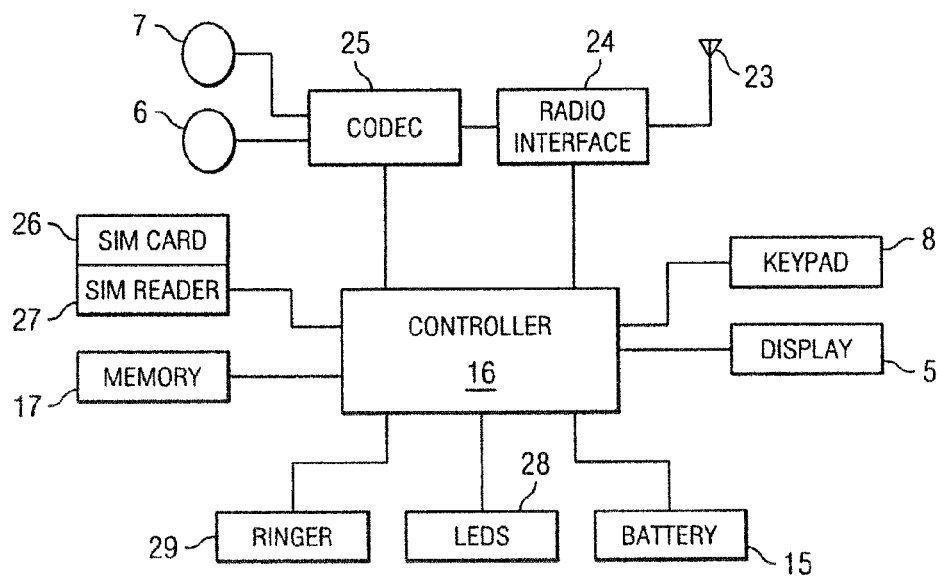
FIG. 4 is a schematic diagram illustrating an example mobile device system architecture.

FIG. 4 shows a schematic representation of the main components of the mobile device 102a, according to one implementation of the invention, which is adapted for use in connection with a GSM network or any other mobile telephone network and may also be configured to meet the wireless application protocol specification (WAP). Any type of wireless or other communications link may be utilized for the present invention. For example, the wireless communication network over which mobile devices 102 may utilize a cellular-based communication infrastructure that include cellular-based communication protocols such as AMPS, CDMA, TDMA, GSM, iDEN, GPRS, EDGE, UMTS, WCDMA and their variants.

The mobile device 102a is powered by a removable battery pack 15. Signal processing is carried out under the control of a digital micro-controller 16 which has an associated RAM/ROM and flash memory 18. Electric analog signals are produced by microphone 7 and are fed to the earpiece 6. The controller 16 receives instruction signals from the keypad 4 including the soft keys 10, 11, 12, 13, 14 and controls the operation of the display 5. Radio signals are transmitted and received by means of an antenna 23 connected through a radio interface 24 to a codec 25 configured to process signals under control of the controller 16. Thus, in use, for speech, the codec 25 receives analog signals from the microphone 7, digitizes them into a form suitable for transmission and feeds them to the radio interface 24 for transmission through antenna element 23 to the public land mobile network (PLMN). Similarly, received signals are fed to codec 25 so as to produce analog signals which are fed to the ear piece 6. The mobile device 102a also includes a subscriber identification module (SIM) card 26, a SIM card reader 27, light emitting diodes (LEDs) 28 and a ringer 29. Mobile device 102a may also be a dual mode phone having a wireless local area network (WLAN) interface, as well as other wireless or physical interfaces (such as BlueTooth® and USB).

Figure 8:
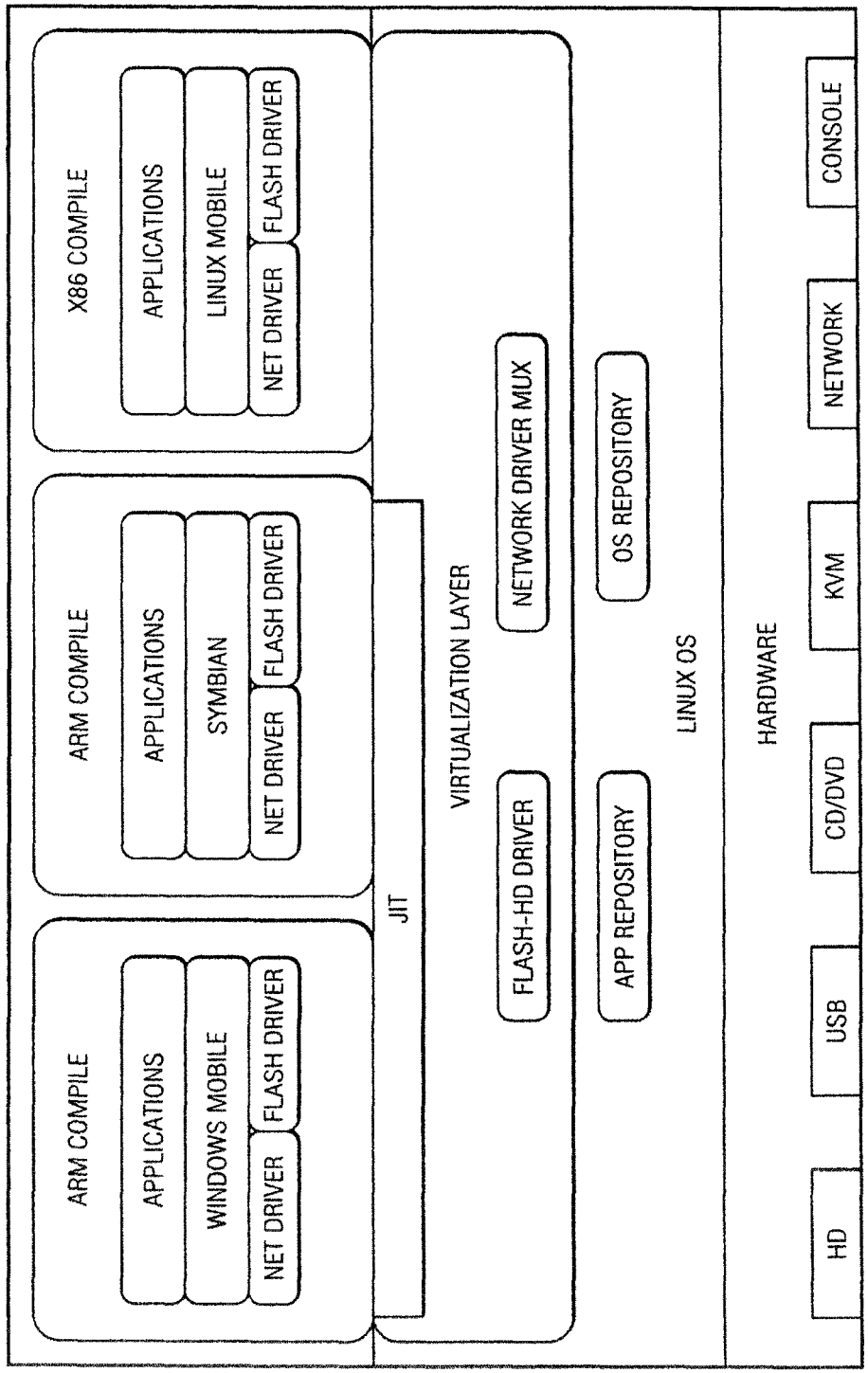
FIG. 8 is a diagram illustrating alternative mobile device virtualization functionality.
Figure 9:
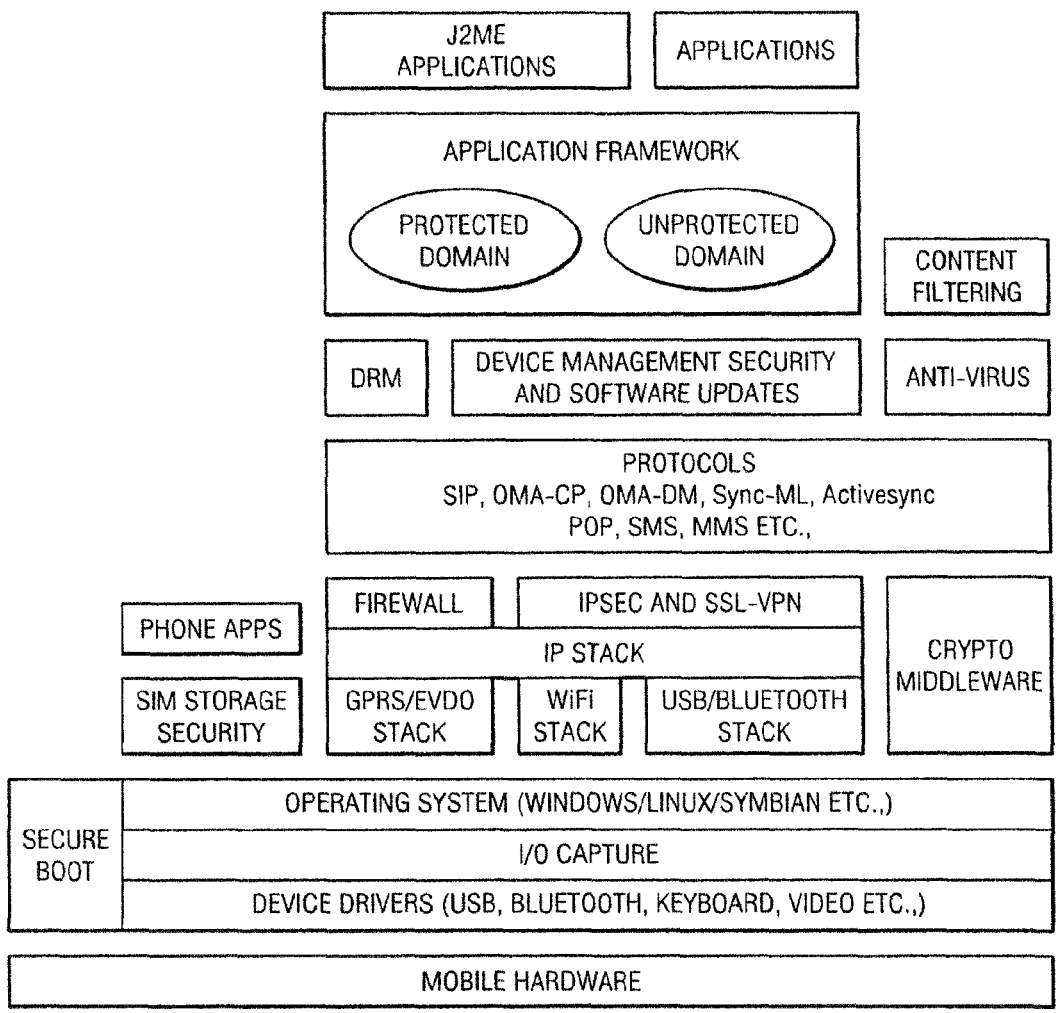
FIG. 9 provides an example mobile device software architecture.

FIG. 8 provides an overview of a mobile device client architecture according to one possible implementation of the invention. As the Figure illustrates, the physical instance of the mobile device 102a may be configured to include one or more software modules that facilitate interaction with device management server 104.

IPSec Client

IPSEC client provides secure connection functionality between the mobile device 102a and device management server 104. The IPSec client, in one implementation, is able to tolerate IP address changes as the client roams from one network to another.

Extended DM/DS Client

In most of the recent implementations DM/DS clients based on OMA spec are included in mobile devices 102a to provide device management and data synchronization functionality. These agents respond to the commands issued by the DM/DS server. There are some open source implementations of DM/DS server and one of those implementations is Funambol. Though the DS spec doesn't specify what needs to be synchronized, most of the implementations on the mobile devices are limited to synchronizing only PIM, contact info and some basic stuff. For synchronizing all data of the mobile client, the DM/DS client is extended.

FOTA Client

Firmware over the air is becoming very popular and most of the system integrators are including the clients that comply to OMA specification in their firmware. There are some extensions to the client in some implementations to deal with specialized synchronization mechanisms.

I/O Capture Driver

For accessing the mobile device remotely, an I/O capture driver can be installed to capture the I/O traffic and redirect that I/O through the network to mobile device management server 104 so that remote users can control the mobile device. This requires plugging in the I/O driver between the real hardware driver and the operating system.

Application Patch Management

Application patches are also delivered through the air similar to the firmware. Sometimes the firmware upgrade includes the whole image including the applications or only parts of the image. In some cases only the software needs to be patched on top of the operating system. In such a case, an application patch manager can reside on top the operating system and handle updates to the applications.

The present invention has been explained with reference to specific embodiments. Other embodiments will be evident to those of ordinary skill in the art. It is therefore not intended that the present invention be limited to the embodiments described above.

What is claimed is:

1. A mobile device management system, comprising:
   a virtual instance mobile device that corresponds to a physical mobile device, wherein the physical mobile device comprises one or more hardware components, an operating system and one or more applications,
   wherein the virtual instance mobile device comprises an operating system and one or more applications corresponding to the operating system and the one or more applications of the corresponding physical mobile device, and
   wherein the operating system and the one or more applications of the virtual mobile instance are executable in a computer runtime environment that includes a hardware emulation component operative to emulate the one or more hardware components of the physical mobile device; and
   a synchronization component configured to synchronize data between the virtual instance mobile device and the corresponding physical mobile device.

2. A mobile device management system as recited in claim 1, wherein the virtual instance mobile device comprises a software emulation component corresponding to software components of the corresponding physical mobile device and is executable within the context of the hardware emulation component.

3. A mobile device management system as recited in claim 2, wherein the hardware emulation component comprises:
  a processor emulator configured to emulate a processor of the corresponding physical mobile device;
  a memory emulator configured to emulate a memory of the corresponding physical mobile device; and
  a network interface emulator configured to emulate at least one network interface of the corresponding physical mobile device, and
  the software emulation component comprises
  the operating system corresponding to the operating system of the corresponding physical mobile device;
  at least one device driver corresponding to at least one device driver of the corresponding physical mobile device respectively; and
  the one or more applications corresponding to the one or more applications of the corresponding physical mobile device respectively.

4. A mobile device management system as recited in claim 3, wherein the hardware emulation component further comprises:
  an input/output (I/O) emulator configured to emulate at least one I/O component of the corresponding physical mobile device; and
  a display emulator configured to emulate a display of the corresponding physical mobile device.

5. A mobile device management system as recited in claim 1, further comprising a user portal configured to enable a user to remotely access and control the corresponding physical mobile device.

6. A method of remotely managing a mobile device, comprising:
  maintaining a virtual instance mobile device that corresponds to a unique physical mobile device, wherein the physical mobile devices comprises one or more hardware components, an operating system and one or more applications,
  wherein the virtual instance mobile device comprises an operating system and one or more applications corresponding to the operating system and the one or more applications of the corresponding physical mobile device, and
  wherein the operating system and the one or more applications of the virtual mobile instance are executable in a computer runtime environment that includes a hardware emulation component operative to emulate the one or more hardware components of the physical mobile device; and
  synchronizing data between the virtual instance mobile device and the corresponding physical mobile device.

7. A method as recited in claim 6, wherein the virtual instance mobile device comprises a software emulation component corresponding to software components of the corresponding physical mobile device and is executable within the context of the hardware emulation component.

8. A method as recited in claim 7, wherein the hardware emulation component comprises:
  a processor emulator configured to emulate a processor of the corresponding physical mobile device;
  a memory emulator configured to emulate a memory of the corresponding physical mobile device; and
  a network interface emulator configured to emulate at least one network interface of the corresponding physical mobile device, and
  the software emulation component comprises
  the operating system corresponding to the operating system of the corresponding physical mobile device;
  at least one device driver corresponding to at least one device driver of the corresponding physical mobile device respectively; and
  the one or more applications corresponding to the one or more applications of the corresponding physical mobile device respectively.

9. A method as recited in claim 8, wherein the hardware emulation component further comprises:
  an input/output (I/O) emulator configured to emulate at least one I/O component of the corresponding physical mobile device; and
  a display emulator configured to emulate a display of the corresponding physical mobile device.

10. A method as recited in claim 9, further comprising:
  executing the virtual instance mobile device in the computer runtime environment to emulate behavior of the corresponding physical mobile device.

11. An apparatus for remotely managing a mobile device, wherein the mobile device comprises one or more hardware components, an operating system and one or more applications, the apparatus comprising:
  a processor;
  a memory;
  a network interface;
  a device emulation component corresponding to the mobile device, comprising
    a hardware emulation component configured to emulate the one or more hardware components of the mobile device; and
    a software emulation component corresponding to software components of the mobile device, wherein the software emulation component comprises an operating system and one or more applications corresponding to the operating system and the one or more applications of the mobile device, and wherein the operating system and the one or more applications of the software emulation component are executable within the context of the hardware emulation component.

12. An apparatus as recited in claim 11, wherein the device emulation component for the mobile device represents a virtual instance mobile device.

13. An apparatus as recited in claim 11, wherein
the hardware emulation component comprises:
  a processor emulator configured to emulate a processor of the mobile device;
  a memory emulator configured to emulate a memory of the mobile device; and
  a network interface emulator configured to emulate at least one network interface of the mobile device, and
the software emulation component comprises:
  an operating system corresponding to the operating system of the mobile device;
  at least one device driver corresponding to at least one device driver of the corresponding mobile device respectively; and
  the one or more applications corresponding to the one or more applications of the corresponding mobile device respectively.

* * * * *